United States Patent [19]

Mouille

[11] Patent Number: 5,267,833
[45] Date of Patent: Dec. 7, 1993

[54] GYROCRAFT ROTOR HUB BODY

[75] Inventor: René L. Mouille, Aix-En-Provence, France

[73] Assignee: Aerospatiale Societe Nationale Industrielle, Paris, France

[21] Appl. No.: 799,245

[22] Filed: Nov. 27, 1991

[30] Foreign Application Priority Data

Dec. 27, 1990 [FR] France .................. 90 16358

[51] Int. Cl.⁵ .............................. B64C 27/32
[52] U.S. Cl. ................. 416/107; 416/106; 416/134 A; 416/140; 416/244 R
[58] Field of Search ............... 416/103, 104, 105, 106, 416/107, 134 A, 140, 230, 244 R

[56] References Cited

U.S. PATENT DOCUMENTS

| 3,322,200 | 5/1967 | Tresch . | |
| 4,257,738 | 3/1981 | Schwarz et al. | 416/134 A |
| 4,352,632 | 10/1982 | Schwarz et al. | 416/134 A |
| 4,407,633 | 10/1983 | Mouille | 416/140 A |
| 4,504,193 | 3/1985 | Mouille | 416/134 A |
| 4,556,365 | 12/1985 | Mouille et al. | 416/134 A |
| 4,652,210 | 3/1987 | Leman et al. | 416/134 A |
| 4,749,339 | 6/1988 | Mouille et al. | 416/134 A |
| 4,915,585 | 4/1990 | Guimbal | 416/107 |
| 5,007,799 | 4/1991 | Mouille et al. | 416/104 |

FOREIGN PATENT DOCUMENTS

| 80920 | 6/1983 | European Pat. Off. . | |
| 85127 | 8/1983 | European Pat. Off. . | |
| 99294 | 1/1984 | European Pat. Off. . | |
| 145512 | 6/1985 | European Pat. Off. . | |
| 0201008 | 12/1986 | European Pat. Off. . | |
| 1756062 | 3/1970 | Fed. Rep. of Germany | 416/105 |
| 3037824 | 5/1982 | Fed. Rep. of Germany | 416/134 A |
| 2454963 | 8/1980 | France . | |

Primary Examiner—Edward K. Look
Assistant Examiner—James A. Larson
Attorney, Agent, or Firm—Nikaido, Marmelstein, Murray & Oram

[57] ABSTRACT

Gyrocraft rotor hub body (1) in which each blade (2) is linked to the body (1) by articulations and linking members the body includes two strong elements (7, 8) whose planes are substantially parallel to each other and perpendicular to the axis of the mast (3) of the rotor. The two elements (7, 8) are separated from each other by a space which is of sufficient size to permit the housing of the articulations which are advantageously embodied in the form of laminated spherical stops (5), one of the armatures (16) of which moves integrally with the (17) is fixed with respect to the two elements of the hub body and is arranged in the vicinity of the periphery of these elements so as to constitute a rigid bracing. The two elements are rings, an external ring (7) and an internal ring (8) each forming a rigid rim and which are linked by a thin wall (9) of substantially cylindrical form, and which comprises at least as many openings (10) as there are blades (2) each opening (10) has dimensions sufficient for the passage of the linking and articulation members of the corresponding blade (2) with their angular flappings.

41 Claims, 8 Drawing Sheets

FIG.9

GYROCRAFT ROTOR HUB BODY

FIELD OF THE INVENTION

The present invention relates to the rotors of gyrocraft and more particularly to the main lift and propulsion rotors and/or to the rear anticouple rotors of helicopters whose head is of articulated type. The head includes a hub body on which each blade is retained against the centrifugal force by stop and articulation members which leave the blade free to oscillate in flapping, in drag and in pitch angles around three mutually perpendicular axes. The invention concerns a hub body for this type of rotor head and a rotor head which comprises this hub body.

The present invention is more particularly adapted to such articulated rotor heads when the stop and, articulation members of each blade are constituted by a single laminated spherical stop.

DESCRIPTION OF THE PRIOR ART

French Patent No. 2 427 251 and its, first certificate of addition No. 2 456 034, as well as French Patent No. 2 516 891, in the name of the applicant, relate to main rotor heads or rear rotors for helicopters, each of which can comprise of a mast and a hub body capable of being integrated in the form of a single piece embodied in a metallic or composite material.

The helicopter rotors described in these documents each comprise a rigid, central hub body. The foot of each rotor blade is coupled to the hub body by a laminated spherical stop and a drag damper, or an elastic drag return strut with damping incorporated.

The laminated spherical stop, which constitutes an articulation transmitting the centrifugal forces from the corresponding blade and allowing the movements of the blade around its three axes of flapping, of drag and of incidence control, comprises a laminated central part, formed by a stack of alternating spherical segments of a rigid material and an elastic material working in compression and shear between an external armature integral with the hub and an internal armature fixed to a linking member on the blade.

The elastic drag return and damping member of the blade (which may be hydraulic) is preferably constituted by a stack of alternating rigid plates and plates of a viscoelastic material, or by coaxial tubes between which is incorporated a cylindrical sleeve of a viscoelastic material.

This member has its ends coupled by balland-socket joints to the foot of the corresponding blade and to a point on the hub, so that for the angular movements of the blade in drag, a vigorous elastic return on the neutral axis is provided, simultaneously inducing a certain damping of these movements.

In French Patent No. 2 427 251, the central body of the hub has the form of a plate or of a flat ring, with a convex polygonal or substantially circular perimeter, extending substantially radially with respect to the axis of rotation of the rotor, coincident with the axis of the mast-rotor supporting the hub. This plate is traversed, in the direction of the axis of the rotor, by as many socket openings as the rotor has blades. A laminated spherical stop is mounted supported by its external armature against the exterior edge of each opening. The internal armature of the spherical stop is fixed to the internal extremities of the branches of a forked piece integral with the foot of the corresponding blade. The point on the perimeter of the hub to which the corresponding elastic drag return and damping member is coupled by a ball and socket joint, is located between the corresponding laminated spherical stop of the corresponding blade and that of the immediately preceding or following blade in the direction of rotation of the rotor. An incidence control-lever for the corresponding blade is fixed to the forked piece on the side opposite said corresponding member. In the case of a main rotor, the lower branch of the forked piece carries, under its internal extremity, a stop which limits the downward flapping of the corresponding blade by cooperation with a reciprocal ring mounted radially sliding around the mast-rotor below the hub, such that the stop comes to rest against the reciprocal ring when the rotor is rotating slowly or is stopped.

The forked piece may be composed of an extension of the foot of the corresponding blade, or by a radial clevis at the internal extremity of an attached member for linking to the foot of the corresponding blade. The two branches of this internal extremity clevis or of this extension are fixed to the corresponding laminated spherical armature by two bolts. In the case of the utilization of the attached member for linking to the foot of the blade, this member also has, at its external extremity, another clevis securing the number to the foot of the corresponding blade by two pins on axes substantially perpendicular to the plane of the rotor one of the pins is movable to permit the blade to be folded in the plane of the rotor by pivoting around the other axis.

In order to integrate a device for automatic folding of the blades into the rotor, it has been proposed that this attached linking member should be shaped as a sleeve having one cylindrical part which permits the housing of this device. The member serves also as the fixing point for the incidence control-lever for the corresponding blade, the corresponding elastic drag return and damping member, and the bottom stop interacting with the reciprocal ring.

With the aim of eliminating all the potential problems which result from a bolted linking of the hub to the mast-rotor, such as stress corrosion or working loose of the bolts, the central body of the hub and the mast may be integrated. It has been proposed that the rigid central body of the hub should constitute an integral metallic piece with the mast of the rotor, for example in steel or in titanium and made by forging or by stamping. However, in order to diminish the vulnerability, the weight or the cost of such an integrated mast-hub, the mast-hub may be made of composite materials by stacking or drape-forming folds of fabric of synthetic mineral fibers with high mechanical strength which are preimpregnated and agglomerated by a synthetic resin, and subsequently polymerized and hardened. In such an embodiment, in order to give the integrated mast-hub a good "fail-safe" character, it is an advantage to have a banding of composite structure wound around the plate of the hub.

The rotors described in the first certificate of addition No. 2 456 034 to the French patent mentioned above are distinguished essentially from those which form the subject of this principal patent by the fact that their hub body comprises a central shaft which extends the mast of the rotor and which carries an upper plate and a lower plate. The external armature of each laminated spherical stop is embedded between these plates and is fixed directly to their edge in the manner of a rigid brace. The foot of the corresponding blade is united to the internal armature of the laminated spherical stop by a radial clevis and hollowed out for the free passage of this spherical stop. This certificate of addition also proposes that the assembly of the hub, including the shaft and two plates, should form an integral piece with the upper part of the mast-rotor which can be metallic and made by forging or by stamping. By analogy with the proposed developments of the rotors described in the principal patent, an embodiment can be envisaged for the rotor equipment according to the certificate of addition mentioned above having an integrated mast-hub with two substantially radial plates and made of a composite structure. It is to be noted that such an embodiment, in the sense of the reduction of the number of pieces and of the elimination of links, would go well beyond the rotor embodiments which are described in the French Patent No. 2 529 860, also in the name of the applicant. These comprise two plates in composite material fixed to a metallic bracing which separates them which are attached on the upper part of the metallic mast-rotor by bolts, in a basic architecture which is identical to that for the rotors described in the French Patent No. 2 516 891. Such would be distinguished essentially from the rotors of the certificate of addition mentioned above by the fact that the foot of each blade has a shackle which directly surrounds the corresponding laminated spherical stop and is fixed to the internal armature of the spherical stop.

However, even if the operation and the service life of the rotor heads embodied in the form of integrated mast-hubs, mentioned above are satisfactory, they can have certain drawbacks;

for the metallic mast-hubs which comprise either a single radial plate with sockets or two radial plates without sockets linked to the end of the mast by which they are driven in rotation and a part in the form of the open, corolla of a flower, fabrication and the machining of the pieces by turning and milling from rough forgings or stampings presents no significant difficulties. On the other hand, the plate or plates and their linking to the mast by a part in the form of the corolla of a flower have fairly solid forms which do not permit optimal utilization of the metallic material with regard to the forces, moments and couples which these pieces transmit, such that these working elements are not optimized in mass;

on the other hand, for the mast-hubs which are of these same types but embodied in composite material, conversely it is easy to predict the direction and the number of successive layers of fibers and/or of the fabrics in order to optimize these pieces from the point of view of their weight, but the industrial fabrication of them is delicate and costly. In fact, the concave or double-concave form of the mast which opens out in the form of a corona of a flower to form the rigid part of the hub and the significant variations in thickness lead to very complex operations of drape-forming and/or of winding of ribbons or of fabrics of fibers with high mechanical strength in this, area of changing shapes having curvatures in directions which are substantially perpendicular.

GENERAL DESCRIPTION OF THE INVENTION

The aim of the present invention is to propose an architecture for the gyrocraft rotor hub body, wherever this hub body linking the blade attachments together is loaded only by the centrifugal forces of traction from each blade in order to transmit them and balance them with those of the blade or blades situated on the opposite side of the hub body, while the vertical lift forces from the blades, the tilting moments from the rotor head as well as the rotational drive couple of the rotor should be transmitted directly between the blade attachments and the external extremity of the mast without involving the hub body itself.

The invention surmounts the different disadvantages described above, and has at the same time a simplified and lighter structure with improved safety and reliability. Additionally, it is still possible for it to be fabricated in metal or in composite materials in a simpler, more economical and more reliable manner.

Thus the subject of the invention is a very rigid hub body, of lower weight, with a longer life, and which can be achieved with simpler and less costly fabrication methods, producing an improvement in the productivity of the gyrocraft which are equipped with it.

The subject of the invention is also a hub body, whose structure is adapted to an embodiment in composite materials, such that it has an even lower weight and a good "fail-safe" character.

The gyrocraft rotor hub body according to the invention is of the type in which each blade is linked to the body by articulations and linking members. The body comprises two strong elements whose planes are substantially parallel to each other and perpendicular to the axis of the mast-rotor. The two strong elements are separated from each other by a space which is of sufficient size to permit the housing of the articulations. These may with advantage be embodied in the form of laminated spherical stops having one of the rigid armatures moving integrally with the foot of the corresponding blade. The other rigid armature of each of the stops is fixed with respect to the two elements of the hub body and is arranged in the vicinity of the periphery of these elements so as to constitute a rigid bracing. This permits the direct transfer of the forces between the rigid armature and the two elements of the hub body.

This arrangement, moreover, permits the laminated spherical stops to be brought closer to the center of the hub and so leads to a reduction in weight and a diminishing of the moments of vibrational excitation linked to the eccentricity of this articulation.

The gyrocraft rotor hub body according to the invention is characterized in that the two elements are rings: one ring which is external with regard to the mast-rotor and one ring which is internal with regard to the mast. Each ring forms a strong and rigid rim. The rings are linked by a thin wall of substantially cylindrical form. This thin wall comprises at least as many openings as there are blades. Each opening is of sufficient dimensions for the passage of the linking and articulation members of the corresponding blade with their angular flappings. For preference, the hub body is constituted by an external ring and an internal ring, which are linked together by the thin wall arranged at the periphery of these rings. The hub body according to the invention is linked to the mast-rotor by a thin base plate of truncated conical form, which is connected to the internal ring. Advantageously, the hub body, the truncated conical base plate and the mast form an integral assembly.

According to one variant of the invention, the hub body and the thin truncated conical base plate form a one-piece assembly and the small base of the truncated conical base plate is fixed by bolts to the extremity of the mast through an annular flange.

According to another variant of the invention, the hub body is linked to the mast-rotor by an independent base plate of thin, truncated conical form, whose large upper base is joined integrally to the lower face of the internal ring by fixing means. These fixing means may, with advantage, be the means of fixing of the rigid armatures of the laminated spherical stops to the two rings of the hub body.

The invention offers the possibility of having at least one of the rings with a circular cylindrical form or, in another configuration, to have at least one of the rings with a polygonal cylindrical form with rounded vertices, of which each vertex corresponds to a blade. Preferably, the internal ring and the external ring are similar, which permits standardization of fabrication.

More precisely, according to the invention, the hub has a structure in which each ring comprises one or two bores in each of the areas of the openings which are made in the thin wall. This bore or these bores is or are made in a widened part of the ring. Each bore in the external ring faces a corresponding bore in the internal ring to receive the fixing means of one of the rigid armatures of the corresponding laminated spherical stop along an axis substantially parallel to the axis of the hub body according to the invention.

Advantageously, and in order to improve the holding of the rings of the hub body against to the centrifugal forces from the blades, at least one of the rings is surrounded by a reinforcement banding of composite materials. Preferably, the external ring and the internal ring are also surrounded by a reinforcement banding. This structure makes it possible to augment the mechanical holding characteristics with either the same weight, or the same mechanical holding characteristics to substantially diminish the weight of the assembly. Moreover, it offers a safety characteristic in fatigue called "fail-safe", particularly with respect to the retention of the blades against the centrifugal forces.

In order to best fulfill its function, it is an advantage to have the reinforcement banding composed of unidirectional fibers with high mechanical strength agglomerated by resin. The fibers may be mineral or synthetic. They are wound and agglomerated by a synthetic resin which is subsequently hot polymerized. According to a preferred composition, this material is composed by unidirectional aramid rovings, which are wound and agglomerated by an epoxy resin, hardened by hot polymerization.

The hub body of a gyrocraft rotor according to the invention, and such as presented above, may be metallic and can be made, for example, in steel, in titanium or in aluminum alloy, by forging or stamping. However, in another embodiment, and in order to diminish the vulnerability, the weight and the cost of such a hub body, the hub body can be made in plastic material strengthened with fibers of high strength.

When the hub body is metallic with one or more rings fitted with a reinforcement banding, the banding can be fitted to advantage into a housing which is provided in the corresponding ring. This housing follows the contour of said ring and has a polygonal cross-section, opening out radially towards the exterior. The invention provides mainly that the housing may be of square cross-section. Alternatively, in one variant of embodiment, this housing may be of rectangular cross-section.

In the case where the rigid hub body is of reinforced plastic material, and according to a preferred embodiment, each ring is composed of as many identical flat pieces as there are blades. These flat pieces are juxtaposed in such a manner as to form, in one continuous assembly, a framework for each of the rings. The flat pieces have a rounded external corner. They are fitted, in the axis of symmetry of the corner, with one or two bores. These bores receive the fixing means of the rigid armature of the laminated spherical stop. Each of these rings is surrounded by a linking and reinforcement banding. The rings are linked together by a thin cylindrical wall in which are cut openings for the passage of the spherical stops and the linking members of the blades.

The flat pieces are, with advantage, made in a molded compound of resin strengthened with cut carbon fibers. According to one variant of the invention, the flat pieces are made by a layering of preimpregnated carbon fabrics, molded and hot-polymerized. A shell is arranged onto this framework by winding and/or drape-forming filaments, ribbons or fabrics of fibers with high strength impregnated with hot-polymerizable synthetic resin in order to form the reinforcement bandings of the rings as well as the thin linking wall of the two rings in which are cut out the openings for the passage of the spherical stops and the linking members of each blade.

With this structure, it is possible to have a base plate which is made by stacking high strength preimpregnated fabrics which are then, molded and hot-polymerized. In one variant embodiment, it is anticipated that this base plate will be made by a stacking of carbon fabrics.

The subject of the invention is also a gyrocraft rotor head of the type comprising a hub body, conforming to the invention presented above. In this configuration, each of these laminated spherical stops has its rigid external armature, which is linked to the two rings by fixing means. These fixing means consist of one or two bolted linking spindles, which are fixed in each of the corresponding bores in said rings, in such a manner as to constitute a rigid bracing between the two rings. Each of these linking pins is constituted by a bolt fitted at its upper extremity with a hexagonal head, and whose thread receives a washer and a stiff nut. The bolt is mounted in a cylindrical hollow shaft, which engages in each of the corresponding bores of the internal and external rings, and in a bore which is made in the rigid external armature of each of the spherical stops. The hollow shaft is fitted with an annular flange which comes to sit against the upper face of the external ring, while the washer sits against the lower face of the internal ring. The hexagonal head of the cylindrical bolt sits against the annular flange. Moreover, and with advantage, each bore receives a bush which is fitted with a shoulder. This shoulder is mounted on the side of the rigid external armature, which sets on said shoulder.

This architecture according to the invention makes it possible, in a first embodiment, to have laminated spherical stops with a rigid internal armature, which is linked to the corresponding blade foot by an arrangement of the blade foot in a single shackle. This single shackle consists of rovings which pass behind the internal armature of the laminated spherical stop.

In a second embodiment, each of the laminated spherical stops has its rigid internal armature, which is linked to the corresponding blade foot by means of an intermediate metallic sleeve whose internal extremity in the form of a chain link surrounds the internal armature of the laminated spherical stop, and which comprises on its external extremity a double blade-attachment clevis with two spindles.

The gyrocraft rotor head according to the invention also comprises, for each blade, linking members which are composed of an elastic drag return and damping strut and a pitch control device. The elastic drag return and damping strut has one of its extremities linked to the corresponding blade foot, and the other extremity linked to the hub body. In one variant of the invention, each strut has one of its extremities linked to the corresponding blade foot, and the other extremity linked to the adjacent blade foot. The pitch control device is composed of a pitch control lever which is driven by a known actuating device, for example by a spider or by cyclic plates.

In order to limit the upwards and downwards flapping of each blade, the gyrocraft rotor head according to the invention comprises flapping stops. At each blade position, there is an upper flapping stop and a lower flapping stop. The upper flapping stop is directly supported on the external ring. The lower flapping stop comes to be supported on a metallic reinforcement which is mounted on the internal ring. This metallic reinforcement is fixed, by means of the vertical linking axis between the lower face of the internal ring and the corresponding washer. The metallic reinforcement is shaped and curved to follow the lower and vertical contour of the internal ring.

In order to limit the angular flapping in drag of each blade, the gyrocraft rotor head according to the invention can be equipped with drag stops, which come to be supported directly against at least one of the rings.

In all the configurations provided by the invention, it can be seen that the rotor head has a hub showing great rigidity and which has an extremely simple structure with a small number of pieces. Moreover, this structure, which is largely open and which frees the central part, permits the mounting there of the articulation and linking elements. The hub according to the invention also has relatively simple forms adapted to the forces to which it is subjected, which permits lowering of the weight and the costs of fabrication of this rotor head, while improving its holding with regard to static and dynamic loading, which is a factor in safety and in reliability. In particular, the compactness of this rotor head permits a slight eccentricity to be given to the flapping articulation of each blade, a favorable arrangement for the reduction of vibratory excitation.

The principal loadings are essentially the centrifugal forces which are exerted longitudinally on the blades and which, in the arrangement of the hub body according to the invention, balance out between opposite blades by loading the two rings of the hub body in traction, each ring simultaneously transmitting substantially half of the load.

These principal loadings also comprise the vertical lift forces from the blades and the tilting moment of the rotor head which, in the arrangement of the hub body according to the invention, passes directly from the blades into the mast by means of the truncated conical base plate arranged between the internal ring and the mast, without involving the two rings of the hub body, the conical form giving to this base plate good resistance to the forces applied on its edges with slight flexural stresses.

These principal loadings finally comprise the motor couple which is exerted on the peak of the mast and which is transmitted directly to the blade attachments by torsion of the truncated cortical base plate, still without involving the rings of the hub body.

Furthermore, the bulk of a rotor head having such a hub is limited due to the housing of the retention and articulation members in its interior part, and aerodynamic drag is reduced. The sum of these advantageous results combines to increase the performance of a helicopter which is equipped with such a rotor head, as much at the level of its principal or lift rotor or rotors, as at the level of its rear or anticouple rotor. Moreover, this arrangement according to the invention is very interesting, for it permits aerodynamic streamlining of the rotor head assembly to be provided, which is relatively easy to produce for this compact form with minimal dimensions. Moreover, the general form of such a rigid hub is well adapted to be made in composite materials rather than the forms known in the prior art, for it allows these composite materials to be loaded and to work in the direction of the fibers, which is rendered possible by the particular distribution of the orientation of the forces, moments and couples mentioned above in the different strong components of the hub body according to the invention.

BRIEF DESCRIPTION OF THE DRAWINGS

Other advantages will emerge from the invention, which will be better understood with the aid of the description given below of particular examples of embodiment, described in a non-limiting way, with reference to the annexed drawings, in which:

FIG. 9 is a view in axial cross-section of the assembly of a gyrocraft rotor head comprising a metallic hub body according to the invention, with the blade feet shackled, said hub body being integrated onto a metallic base plate and the attachment of the means of elastic linking and drag damping of each blade being made at the periphery of the hub body;

DESCRIPTION OF PREFERRED EMBODIMENTS

Figure 1:
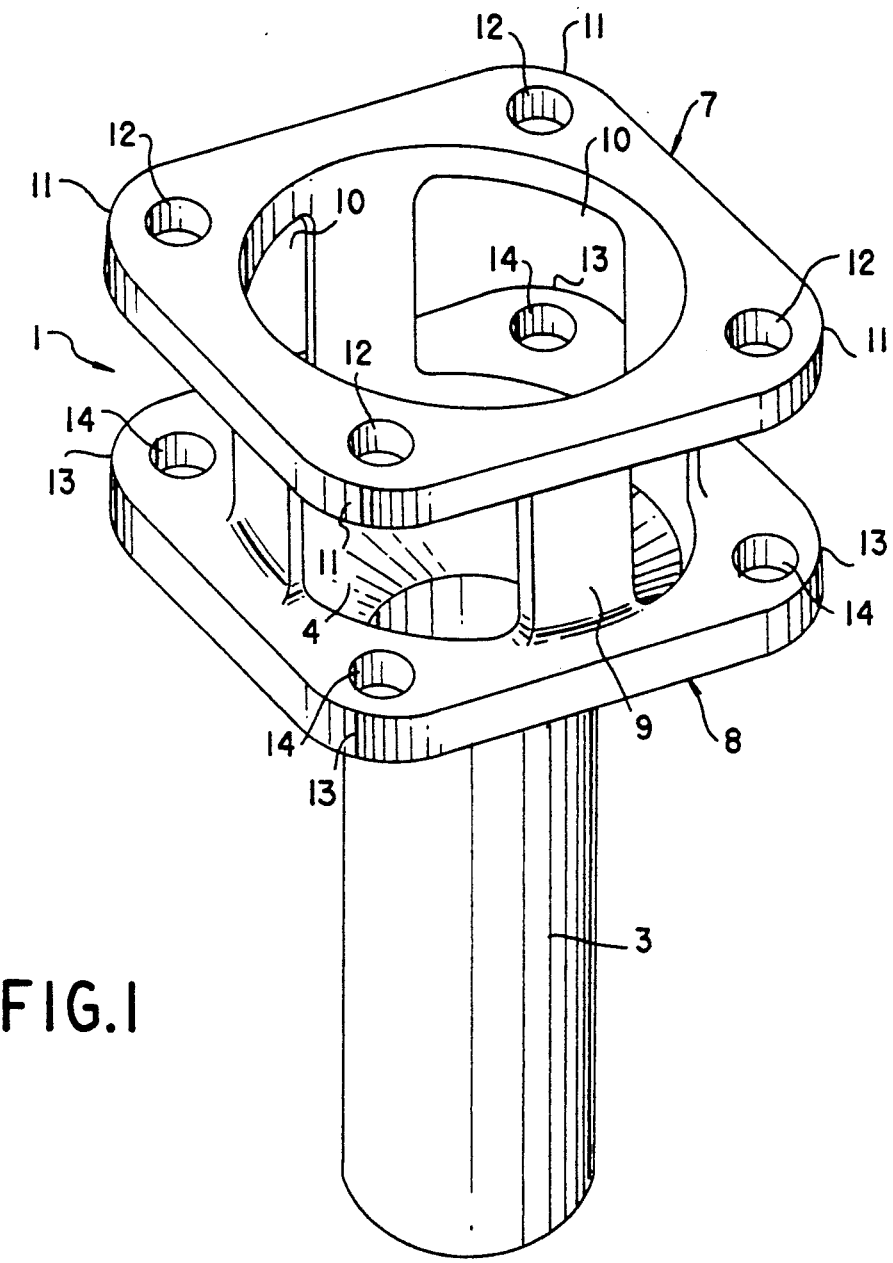
FIG. 1 is a schematic view in perspective of the integral hub body for a gyrocraft according to the invention.

FIG. 1 is a schematic view in perspective of a gyrocraft rotor head single-piece hub body 1 according to the invention which is of the type in which each blade 2 of the rotor is linked to the hub body 1 by articulations and linking members. The hub body 1 comprises two strong ringshaped elements, an external ring 7 and an internal ring 8. The external ring 7 and the internal ring 8 are situated in planes which are substantially parallel with respect to each other, and which are perpendicular to the axis of the rotor mast 3. These two rings 7 and 8 are separated from each other by a space of sufficient size to permit the housing of the articulations which are made in the form of laminated spherical stops 5. Each of these laminated spherical stops 5 is linked on the one hand with the foot of the corresponding blade 2 with which it moves integrally around three perpendicular axes meeting at the center of the spherical stop, and on the other hand, to the periphery of the two rings 7 and 8, in such a way as to constitute a rigid bracing between them. The external ring 7 and the internal ring 8 each form a rigid rim and are linked to each other by a thin wall 9 of substantially cylindrical form arranged substantially at the periphery of these rings. The thin wall 9 has openings 10 which are of sufficient dimensions to permit the passage of the laminated spherical stop 5 with the attachment of the corresponding blade 2.

Figure 2:
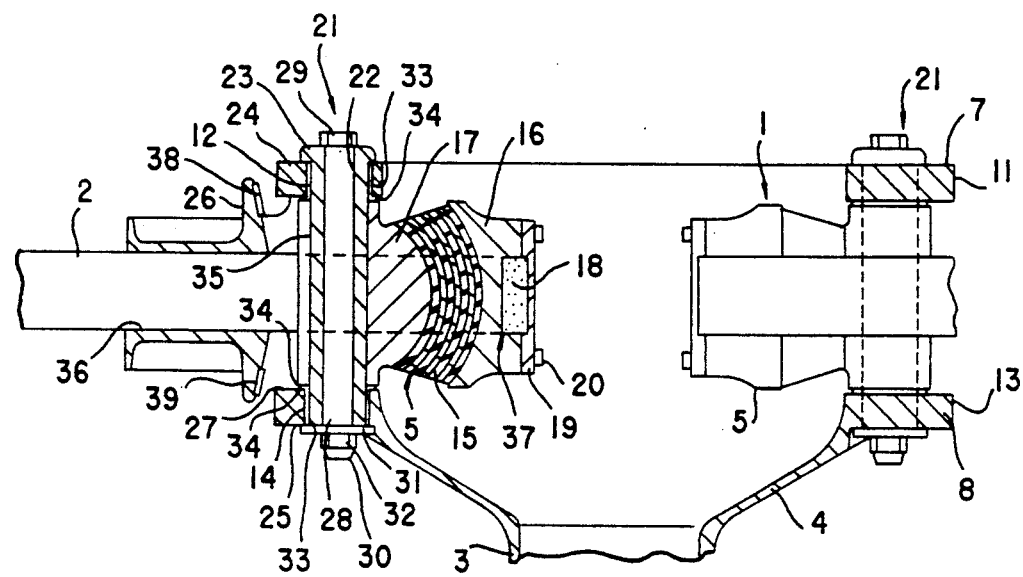
FIG. 2 is a view in axial section of the assembly of a gyrocraft rotor head comprising a metallic hub body corresponding to FIG. 1 with the blade feet shackled, the section plane passing through the plane II—II in FIG. 3.
Figure 3:
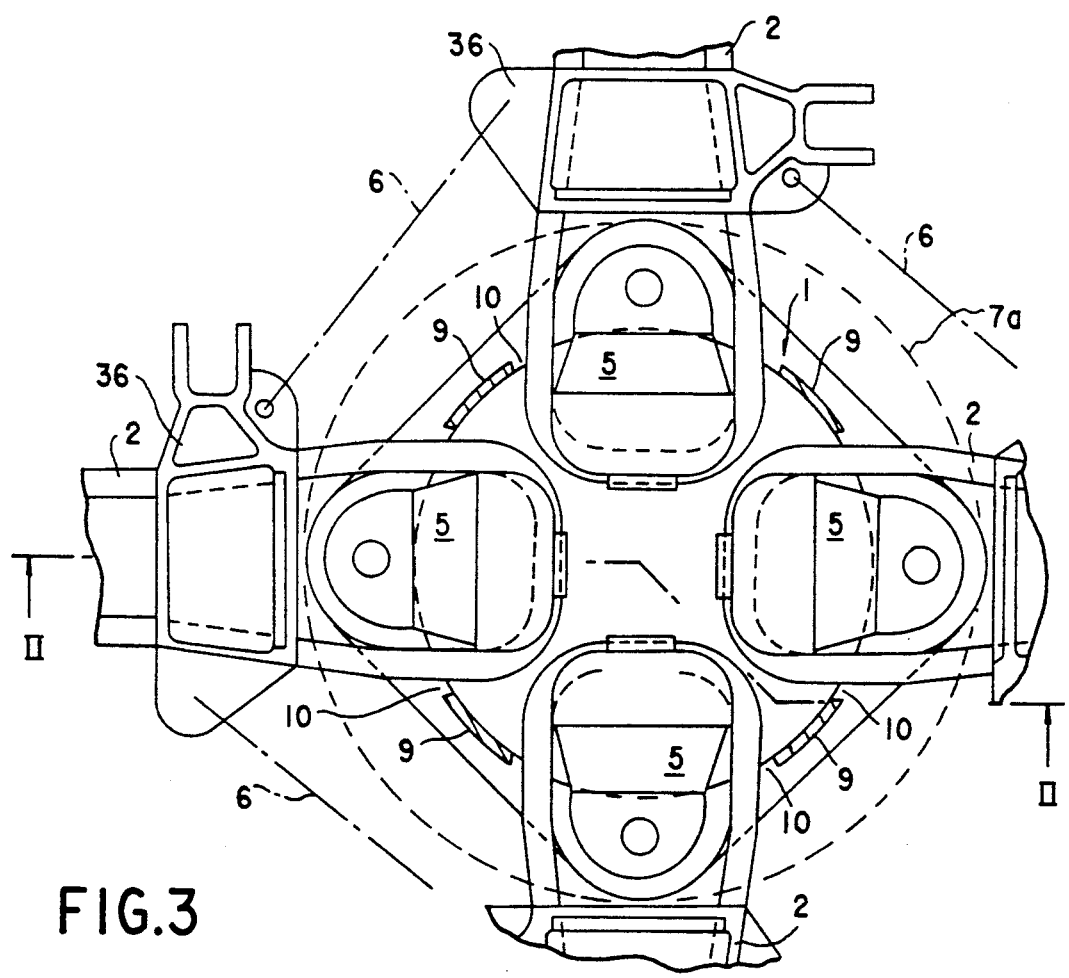
FIG. 3 is a view in partial section of FIG. 2 through the plane passing through the axis of the blades, the elastic linking and drag damping elements being arranged between two adjacent blades.

FIGS. 1, 2 and 3 represent an embodiment of the invention in which the gyrocraft rotor hub body 1 is metallic and is integral with the mast 3. In this architecture, the hub body 1 comprises an external ring 7 and an internal ring 8 which are linked to each other by a thin wall 9. Into this thin wall 9 are cut openings 10 letting the laminated spherical stops 5 pass, in such a way that, between two adjacent blades 2, there is only one element of the thin linking wall 9 remaining between the external ring 7 and the internal ring 8.

In the example shown in FIG. 1, the hub body 1 is linked to the extremity of the rotor mast 3 by, a base plate 4 of truncated conical form convergent towards the extremity of the mast 3, in such a way as to link the internal ring 8 of the hub body 1 with the mast 3. The thin base plate 4 has its large external base integrally joined to the internal ring 8 and it has its small internal base integrally joined to the extremity of the rotor mast 3 in such a way as to form a single integral assembly.

The external ring 7 and the internal ring 8 are similar and have a polygonal cylindrical form with rounded vertices. The external ring 7 has rounded vertices 11 and the internal ring 8 has rounded vertices 13 which each correspond to the position of a blade 2. Thus, the axis of a rounded vertex 11 corresponds to the axis of a rounded vertex 13, both of which correspond to the axis of the opening 10 of the thin wall 9 and to the axis of the corresponding blade 2. In the case of FIGS. 1, 2 and 3, the rotor for a helicopter comprises four blades which are diametrically opposed and mounted in a hub body 1 with rings having a square form with rounded vertices 11 and 13 which correspond to the openings 10 of the thin wall 9. The rings 7 and 8 can be circular as shown in chain line 7a in FIG. 3.

The laminated spherical stops 5 which constitute the sole articulation retention member of each blade in flapping, drag and pitch are of a well-known type. They comprise a central part 15 associated with a rigid internal armature 16 and a rigid external armature 17. The central part 15 is composed of a stack of alternating rigid layers which are generally metallic and layers of elastomer in the form of a spherical segment.

This central part 15 is bonded in an internal radial position, on the convex face of the spherical segment of the rigid external armature 17, and in an external radial position on the concave face of the spherical segment of the rigid internal armature 16 of the laminated spherical stop 5.

Each of these laminated spherical stops 5 is arranged between the external ring 7 and the internal ring 8, and they are fixed to these rings by their rigid external armature 17. For that reason the external ring 7 has bores 12 and the internal ring 8 has bores 14. These bores 12 and 14 are each arranged in the area of the openings 10 made in the thin wall 9. Each bore 12 is situated on the axis of the corresponding blade 2 and is made in a widened part of the external ring 7; and each bore 14 is situated on the axis of the corresponding blade 2 and is made in a widened part of the internal ring 8. Each bore 12 in the external ring 7 faces a corresponding bore 14 in the internal ring 8 in such a manner as to receive the fixing means of the external rigid armature 17 of the corresponding laminated spherical stop 5. The two bores 12 and 14 which are face to face, are aligned on an axis which is substantially parallel to the axis of the hub body 1. Each of these bores is thus the axis of the fixing means of each of the corresponding laminated spherical stops 5 onto the external 7 and internal 8 rings.

Each of the fixing means of the laminated spherical stops 5 is composed of a bolted linking pin 21, which comprises a bolt 28 mounted in a hollow cylindrical shaft 22. The hollow cylindrical shaft is fitted, at one of its extremities, with an annular flange 23. This hollow cylindrical shaft 22 is mounted in the corresponding bore 12 in the external ring 7, in a bore 35 of the external armature 17 of the corresponding laminated spherical stop 5, and in the corresponding bore 14 of the internal ring 8. The annular flange 23 sits on the external face 24 of the external ring 7. The bolt 28 engages in the hollow cylindrical shaft 22, has a head 29 which sits on the cylindrical flange 23, and has another threaded extremity 30 onto which is engaged a washer 31 and a stiff nut 32. The length under the annular flange 23 of the hollow cylindrical shaft 22 is slightly less than the distance between the external face 24 of the external ring 7 and the external face 25 of the internal ring 8 so that the stiff nut 32 comes to tighten the assembly by seating the washer 31 on the border of the bore 14 belonging to the external face 25 of the internal ring 8. Moreover, each bore 12 and 14, made in the rings 7 and 8, carries a bush 33 fitted with a shoulder 34. The bush 33 which is mounted in the bore 12 has its shoulder 34 on the side of the internal face 26 of the external ring 7. The bush 33 which is mounted in the bore 14 has its shoulder 34 on the side of the internal face 27 of the internal ring 8. In this manner, each shoulder 34 comes to sit on the external armature 17 of the corresponding laminated spherical stop 5 forming a bracing between the two rings 7 and 8.

In the embodiment of the invention represented in FIGS. 2 and 3, each laminated spherical stop 5 has its internal armature embedded in the interior of a rigid shackle 18 constituting the attachment of the blade 2. Thus, the blade 2, in the root area, is fitted out as a rigid shackle 18 of rectangular cross-section which constitutes the attachment of the blade 2 and surrounds the laminated spherical stop 5 in a continuous fashion. The attachment of the blade 2 in the form of a rigid shackle 18 is embedded in a corresponding housing 37 made in the internal armature 16 of the spherical stop 5 and is maintained in place by a plate 19 fixed onto the internal armature 16 by screws 20. The rigid shackle 18 is composed of rovings. Each roving is made by an assembly of basic threads, of filaments or of synthetic or mineral fibers with high mechanical strength, for example of glass, which are coated and agglomerated in parallel in a bundle by a hardened synthetic resin. This rigid shackle 18 extends into the current part of the blade 2 progressively forming the strong spar, on the leading edge, as well as elements of the trailing edge.

The linking members between the hub body 1 according to the invention and each of the blades 2 are constituted by elastic blade drag return and damping struts 6, which are shown schematically by dashed lines in FIG. 3. These linking members also comprise a pitch controlling device which is embodied by a pitch control lever driven by an actuating device. In the embodiment represented, this pitch control lever is constituted by a clevis mounted between the extremities of two plates 36, one of which plates is arranged on the internal part of the foot of the blade 2, and the other of which is arranged on the external part of this same blade 2. Each of the elastic drag return and damping struts 6 of the blade 2 is arranged at the exterior of the hub body 1, and has one of its extremities linked to the foot of the corresponding blade and the other extremity linked to the foot of the adjacent blade. To do this, each of the extremities of the elastic drag return and damping strut 6 of the blade 2 is attached by an axis of articulation to the clamping plate 36 of the foot of the corresponding blade 2. Moreover, in this embodiment of the invention, the thin wall 9 has a form which is substantially circular. It must also be noted that, according to a variant of the invention represented in FIG. 3, the external 7 and internal 8 rings can have a circular form.

The rotor head which is equipped with the hub body 1 according to the invention also comprises flapping stops constituted by a top flapping stop block 38, and by a bottom flapping stop block 39. The top flapping stop block 38 is fitted onto a boss which is arranged above the external plate 36. This top stop comes to press directly on the external ring 7. The bottom flapping stop block 39 is also fitted onto a boss which is arranged below the internal plate 36. This bottom stop comes to press directly on the internal ring 8.

Figure 4:
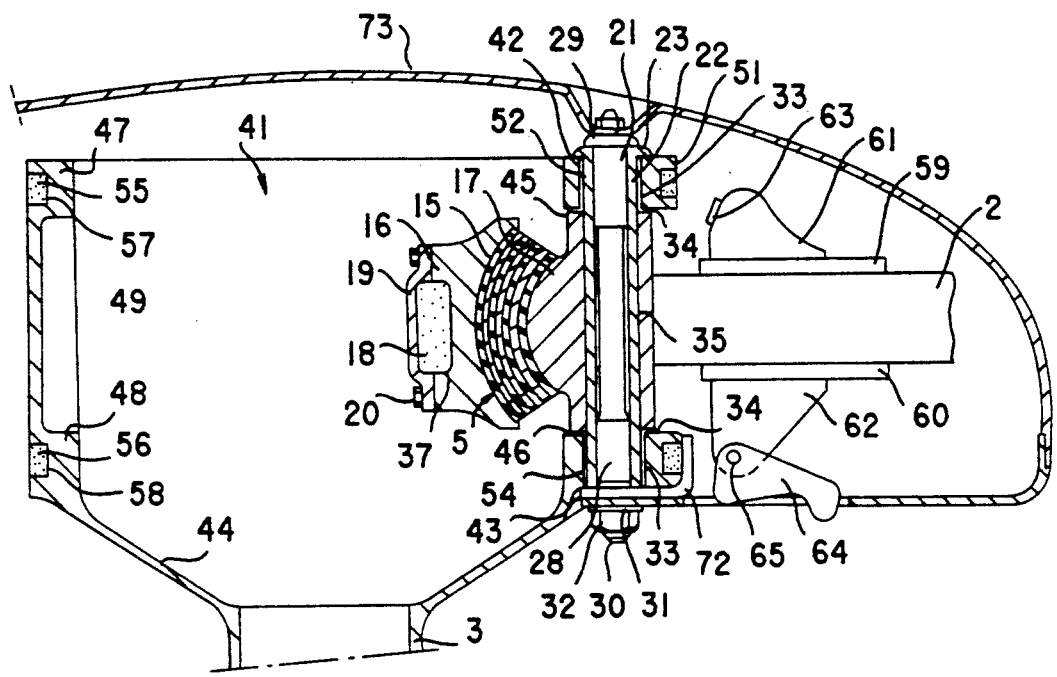
FIG. 4 is a view in axial cross-section of the assembly of a gyrocraft rotor head comprising an integral metallic rotor body according to another embodiment of the invention, with the blade feet shackled, the section plane passing through the plane IV—IV in FIG. 5.
Figure 5:
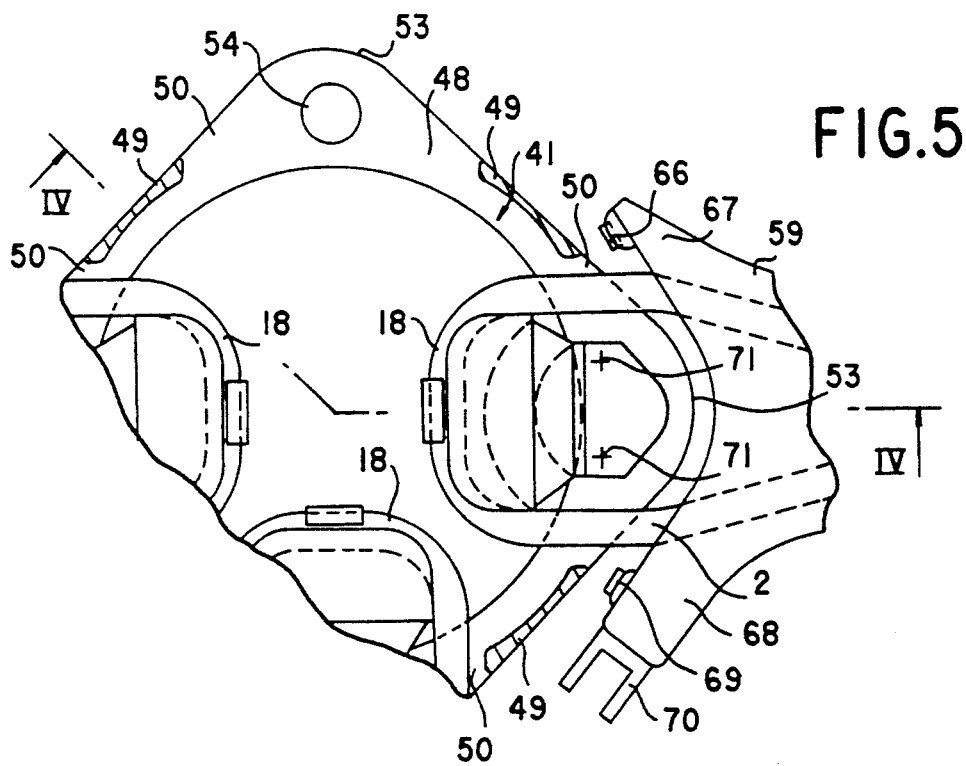
FIG. 5 is a view in partial cross-section of FIG. 4 through the plane passing through the axis of the blades, the whole blade situated in the upper part of the figure not being represented.

FIGS. 4 and 5 show an embodiment of the invention in which the hub body 41 of the gyrocraft rotor is metallic and made integral with the rotor mast 3. In this architecture, the hub body 41 comprises an external ring 47 and an internal ring 48 which are linked to each other by a thin wall 49 of substantially cylindrical form arranged at the periphery of these rings. Openings 50 are cut into this thin wall 49 letting the laminated spherical stops 5 pass such that, between two adjacent blades 2, there is only one element of the linking thin wall 49 remaining between the external ring 47 and the internal ring 48. The two rings 47 and 48 are separated from each other by a space sufficiently large to permit the housing of the laminated spherical stops 5. Each of these laminated spherical stops 5 is linked on the one hand with the foot of the corresponding blade 2, with which it moves integrally around three perpendicular axes meeting at the center of the spherical stop 5, and on the other hand to the periphery of the two rings 47 and 48 in such a way as to constitute a rigid bracing between them. Each of the openings 50 is of sufficient dimensions to permit the passage of the laminated spherical stop 5 with the attachment of the corresponding blade 2.

In the example represented in FIGS. 4 and 5, the hub body 41 is linked to the extremity of the mast 3 by a thin base plate 44 of truncated conical form converging towards the extremity of the mast 3 in such a way as to link the internal ring 48 of the hub body 41 with the mast 3. The base plate 44 has its large external base made integral with the internal ring 48 and has its small internal base which made integral with the extremity of the rotor mast 3 in such a way as to form a single integral assembly.

The external ring 47 and the internal ring 48 are similar and have a polygonal cylindrical form with rounded vertices. The external ring 47 has rounded vertices 51 and the internal ring 48 has rounded vertices 53 which each correspond to the position of a blade 2. Thus, the axis of a rounded vertex 51 corresponds to the axis of a rounded vertex 53, which both correspond to the axis of the opening 50 in the thin wall 49 and to the axis of the corresponding blade 2. In the case of FIGS. 4 and 5, the helicopter rotor comprises four diametrically opposed blades mounted in a hub body 41 with rings 47 and 48 having a square form with rounded vertices 51 and 53 which correspond to the openings 50 of the thin wall 49.

The laminated spherical stops 5 which constitute the single articulation and retention member of each blade in flapping, drag and pitch are of a well-known type, and are analogous with those described previously. They comprise a central part 15 associated with a rigid internal armature 16, and an external rigid armature 17. The central part 15 is composed of a stack of alternating rigid layers which are generally metallic and elastomer layers in the form of a spherical segment. The central part 15 is bonded on the one hand in an internal radial position onto the convex face of the spherical segment of the rigid external armature 17, and on the other hand in an external radial position onto the concave face of the spherical segment of the rigid internal armature 16 of the laminated spherical stop 5.

Each of these laminated spherical stops 5 is arranged between the external ring 47 and the internal ring 48, and fixed to these rings by their rigid external armature 17. For that reason, the external ring 47 has bores 52 and the internal ring 48 has bores 54. These bores 52 and 54 are each arranged in the area of the openings 50 made in the thin wall 49. Each bore 52 is situated on the axis of the corresponding blade 2 and is made in a widened part of the external ring 47; and each bore 54 is situated on the axis of the corresponding blade 2 and is made in a widened part of the internal ring 48. Each bore 52 of the external ring 47 faces a corresponding bore 54 in the internal ring 48 in such a manner as to be able to receive the fixing means of the rigid external armature 17 of the corresponding laminated spherical stop 5. The two bores 52 and 54 which are face-to-face are aligned on an axis which is substantially parallel to the axis of the hub body 41. Each of these bores is thus the axis of the fixing means of each of the corresponding laminated spherical tops 5 onto the external 47 and internal 48 rings.

Each of the fixing means of the laminated spherical tops 5 is composed of a bolted linking pin 21, which comprises bolt 28 mounted in a hollow cylindrical shaft 22. The hollow cylindrical shaft 22 comprises, at one of its extremities, an annular flange 23. This hollow cylindrical shaft 22 is mounted in the corresponding bore 52 of the external ring 47, in a bore 35 of the external armature 17 of the corresponding laminated spherical stop 5, and in the corresponding bore 54 of the internal ring 48. The annular flange 23 sits on the external face 42 of the external ring 47. The bolt 28 engages in the hollow cylindrical shaft 22, has a head 29 which sits on the annular flange 23, and has another threaded extremity 30 onto which is engaged a metallic reinforcement 72, a fairing 73, a washer 31 and a stiff nut 32. The length under the annular flange 23 of the hollow cylindrical shaft 22 is slightly less than the distance between the external face 42 of the external ring 47 and the external face 43 of the internal ring 48 so the stiff nut 32 tightens the assembly by seating the washer 31 against the fairing 73 in such a way that the metallic reinforcement 72 sits on the border of the bore 54 belonging to the external face 43 of the internal ring 48. Moreover, each bore 52 and 54, made in the rings 47 and 48, carries a bush 33 fitted with a shoulder 34. The bush 33, which is mounted in the bore 52, has its shoulder 34 on the side of the internal face 45 of the external ring 47. The bush 33, which is mounted in the bore 54, has its shoulder 34 on the side of the internal face 46 of the internal ring 48. In this manner, each shoulder 34 comes to sit on the external armature 17 of the corresponding laminated spherical stop 5 forming a bracing between the two rings 47 and 48.

In order to improve the behavior characteristics in fatigue of the hub body 41 according to the invention, each ring is surrounded by a belt 55 and 56 of the reinforcing banding type engaged and mounted in a housing made in each one of the external 47 and internal 48 rings. This housing follows the contour of the corresponding ring and has a polygonal cross-section which is opened out radially to the exterior. This cross-section has a rectangular form and has its length substantially parallel to the axis of the hub body 41. In one variant of the embodiment of the invention shown in the FIG. 9, this cross-section could also be square.

In order to get the best out of this reinforcing banding arrangement, and to maximize the so-called "fail-safe" characteristics, these reinforcing bandings are made of composite material. More precisely, this composite material is composed of unidirectional fibers with high mechanical strength which are either mineral, or synthetic, wound and agglomerated by a hot-polymerized synthetic resin. More precisely, this composite material is composed of unidirectional aramid rovings, wound and agglomerated by a hot polymerized epoxy resin. In another variant of embodiment, this composite material is composed of ribbons of fibers with high mechanical strength of the aramid type, wound and agglomerated by polymerizable synthetic resin of the epoxy type. In these two embodiments, the belts 55 and 56 form a safety and reinforcing banding of unidirectional fibers with high mechanical strength preimpregnated with polymerizable synthetic resin. Each of these belts 55 and 56 is made of rovings or of ribbons which comprise such fibers. The belts are put in place in the housing 57 of the ring 47 and in the housing 58 of the ring 48 by winding, the resin being subsequently hot polymerized. In another variant of the invention, the belts 55 and 56, forming a safety and reinforcing banding, are made of metallic, for example steel, threads embedded in an elastomer.

In the embodiment of the invention shown in FIGS. 4 and 5, each laminated spherical stop 5 has its internal armature 16 embedded in the interior of a rigid shackle 18 constituting the attachment of the blade 2. Thus the blade 2, in the root area, is made of a rigid shackle 18 of rectangular cross-section which constitutes the attachment of the blade 2 and surrounds the laminated spherical stop 5 in a continuous fashion. The attachment of the blade 2 in the form of a rigid shackle 8 is embedded in a corresponding housing 37 made in the internal armature 16 of the stop and is maintained in place by a plate 19 fixed onto the internal armature 16 by screws 20. As in the preceding example, the rigid shackle 18 is composed of rovings.

The linking members between the rigid hub body 41 according to the invention and each of the blades 2 are composed of blade elastic drag return and damping struts, which are not shown in FIG. 5. These linking members also comprise a device for pitch control which is embodied as a pitch control lever linked to the rotor controls. In the embodiment shown, this pitch control lever consists of a clevis 70 which is mounted on a lateral protrusion 68 between the extremities of the two plates 59 and 60, one of which is mounted on the external side of the foot of the blade 2, and the other of Which is mounted on the internal side of the blade foot.

The rotor head which is equipped with the hub body 41 according to the invention also comprises flapping stops composed of a top stop of the direct support type, and a bottom stop of the retractable type. The top stop is composed of a block 63, and the bottom stop by a flapping block 64. The flapping block 63 is fitted onto a boss 61 which is arranged on the external plate 59. The top stop comes to press directly, for a given angle of flapping, on the external ring 47. The bottom flapping stop is composed of the bottom stop block 64 which is fitted onto a lever mounted between two lugs 62 arranged on the internal plate 60. Under the action of centrifugal force, the bottom stop and its block 64 pivot against a return spring, which is not shown, around a shaft 65 which is mounted on the two lugs 62. The bottom flapping stop 64 comes to rest for a given negative angle of flapping and for a low or zero speed of the rotor, on the metallic reinforcement 72 fixed on the circumference of the internal ring 48 by the bolted linking pin 21. The metallic reinforcement 72 is arranged on the external face 43 of the internal ring 48, and the fairing 73 held by the washer 31 of the linking pin 21. The metallic reinforcement 72 is shaped and curved to follow the lower and vertical contour of the internal ring 48.

The rotor head which is equipped with the hub body 41 according to the invention also comprises drag stops 66 and 69, which come to rest directly against at least one of the external 47 and internal 48 rings, as can be seen in FIG. 5, these drag stops 66 and 69 being fitted onto each of the extremities of the corresponding plate 59 or 60.

Moreover, a device provides possible immobilization of each of the laminated spherical stops 5 in drag. For this purpose, each of the external armatures 17 is immobilized in drag by two fixing screws 71 which go through the external ring 47. This immobilization could equally be achieved by fixing screws which go through the internal ring 48.

The rotor head equipped with the hub body 41 according to the invention offers the advantage of having in structure which frees the central part of the rotor, which allows the whole of the device with the linkings for the blade feet to be brought closer to the axis of the rotor. Therefore, this particularly compact design allows the entire rotor head to be faired, as is shown on FIG. 4, by the fairing 73 which covers the entire device. This fairing 73 surrounds the hub body 41 and comes under each of the blade feet. In this configuration, the fairing 73 can be fixed in the external part on the external ring 47 and is attached in the interior of the internal ring 48. For that reason, the fairing 73 rests against the metallic reinforcements 72 via holes in which are engaged the threaded extremities 30 of the bolted linking pins 21.

The rigid hub body 41 comprises an external ring 47 and an internal ring 48 which have a polygonal cylindrical form with rounded vertices 51 and 53, each of these vertices corresponding to a blade 2. The wall 49 itself has a polygonal cylindrical form. In a variant of the invention not shown in the figures, the external 47 and internal rings 48 can have a circular form.

Figure 6:
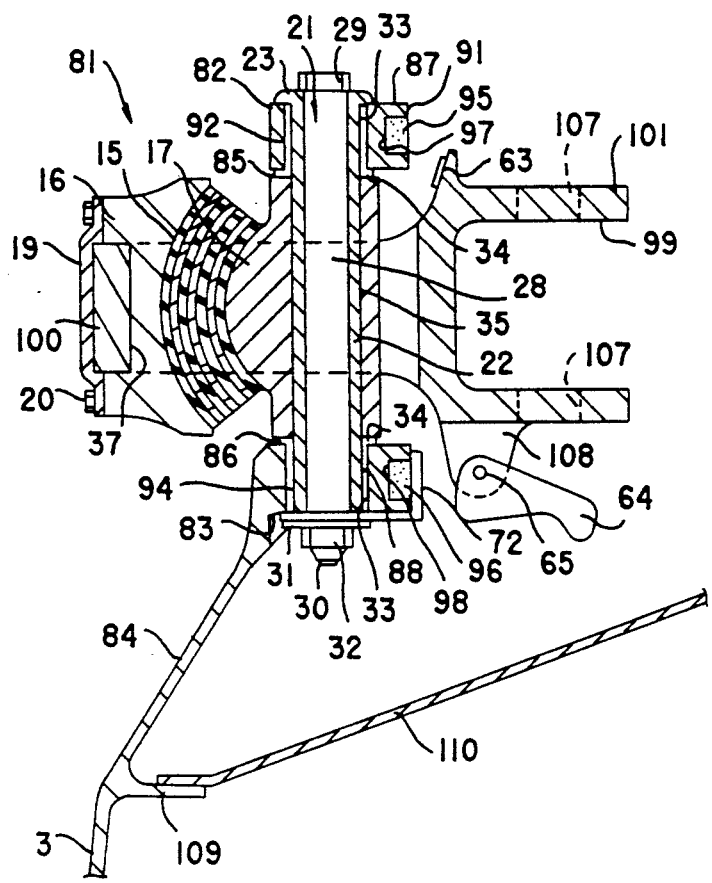
FIG. 6 is a view in axial cross-section of the assembly of a gyrocraft rotor head comprising an integral metallic hub body according to another embodiment of the invention which is connected to each blade by an intermediate sleeve, the section plane passing through the plane VI—VI in FIG. 7.
Figure 7:
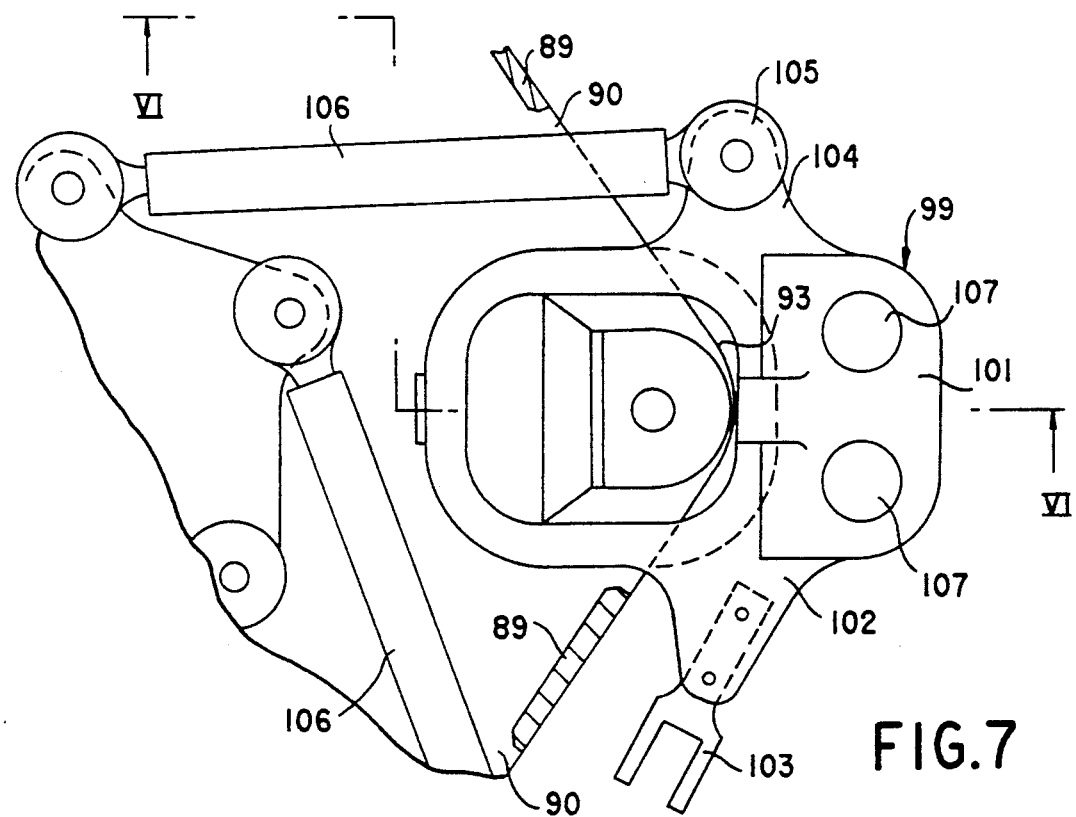
FIG. 7 is a view in partial cross-section of FIG. 6 through the plane passing through the axis of the blades, the attachment of the means of elastic linking and drag damping of each blade being made in the central area of the hub body.

FIGS. 6 and 7 relate to a rotor head equipped with a hub body 81 according to the invention, which has a structure similar to those previously described. That is to say, it is metallic and made integrally with a base plate 84 and a rotor mast 3. In this other configuration of the invention, the articulations of the invention, which are laminated spherical stops 5, are connected to each of the corresponding blades 2 by an integral intermediate sleeve 99. In this architecture, the hub body 81 comprises an external ring 87 and an internal ring 88 which are linked to each other by a thin wall 89 of substantially cylindrical form arranged at the periphery of these rings. Openings 90 are cut into this thin wall 89 letting the laminated spherical stops 5 pass, in such a way that, between two adjacent plates, there is only one element of the thin linking wall 89 remaining between the external ring 87 and the internal ring 88. The two rings 87 and 88 are separated from each other by a space of sufficient size to permit the housing of the laminated spherical stops 5. Each of these laminated spherical stops 5 is linked on the one hand with the foot of the corresponding blade 2 with which it moves integrally around three perpendicular axes meeting at the center of the spherical stop 5, and on the other hand to the periphery of the two rings 87 and 88 in such a way as to constitute a rigid bracing between them.

In the examples shown in FIGS. 6 and 7, the hub body 81 is linked to the extremity of the mast 3 by a thin base plate 84 of truncated conical form convergent towards the extremity of the mast 3 in such a way as to link the internal ring 88 of the hub body 81 with the mast 3 of the rotor. The thin base plate 84 has its large external base integrally joined to the internal ring 88 and it has its small internal base integrally joined to the extremity of the rotor mast 3 in such a way as to form a single integral assembly.

The external ring 87 and the internal ring 88 are similar and have a polygonal cylindrical form with rounded vertices. The external ring 87 has rounded vertices 91 and the internal ring 88 has rounded vertices 93 which each correspond to the position for a blade 2. Thus, the axis of a rounded vertex 91 corresponds to the axis of a rounded vertex 93, both of which correspond to the axis of the opening 90 of the thin wall 89 and to the axis of the corresponding blade 2. In the case of FIGS. 6 and 7, the rotor for a helicopter comprises four blades which are diametrically opposed and mounted in a hub body 81 with rings having a square form with rounded vertices 91 and 93 which correspond to the openings 90 of the thin wall 89.

The laminated spherical stops 5 which constitute the sole articulation retention member of each blade in flapping, drag and pitch are of a type similar to the stops described in the preceding systems. These stops comprise a central part 15 associated with a rigid internal armature 16 and a rigid external armature 17. The central part 15 is composed of a stack of alternating rigid layers which are generally metallic and layers of elastomer in the form of a spherical segment. This central part 15 is bounded on the one hand in an internal radial position on the convex face of the spherical segment of the rigid external armature 17, and on the other hand in an external radial position, on the concave face of the spherical segment of the rigid internal armature 16 of the laminated spherical stop 5.

Each of these laminated spherical stops 5 is arranged between the external 87 and the internal ring 88, and fixed to these rings by their rigid external armature 17. For that purpose, the external ring 87 and the internal ring 88 have bores 92 and 94. These bores 92 and 94 are each arranged in the area of the openings 90 made in the thin wall 89. Each bore 92 is situated on the axis of the corresponding blade 2 and is made in a widened part of the external ring 87; and each bore 94 is situated on the axis of the corresponding blade 2 and is made in a widened part of the internal ring 88. Each bore 92 in the external ring 87 faces a corresponding bore 94 in the internal ring 88 in such a manner as to be able to receive the fixing means of the external rigid armature 17 of the corresponding laminated spherical stop 5. The two bores 92 and 94 which are face-to-face, are aligned on an axis which is substantially parallel to the axis of the hub body 81. Each of these bores is thus the axis of the fixing means of each of the corresponding laminated spherical stops 5 onto the external 87 and internal 88 rings.

As in the systems described above, the fixing means of each of the laminated spherical stops 5 are composed of a bolted linking pin 21, which comprises a bolt 28 mounted in a hollow cylindrical shaft 22. The hollow cylindrical shaft 22 comprises, at one of its extremities, an annular flange 23. This hollow cylindrical shaft 22 is mounted in the corresponding bore 92 of the external ring 87, in a bore 35 of the external armature 17 of the corresponding laminated spherical stop 5, and in the corresponding bore 94 of the internal ring 88. The annular flange 23 sits on the external face 82 of the external ring 87. The bolt 28 engages in the hollow cylindrical shaft 22, has a head 29 which sits on the annular flange 23, and has another threaded extremity 30 onto which is engaged a metallic reinforcement 72, a washer 31 and a stiff nut 32. The length under the annular flange 23 of the hollow cylindrical shaft 22 is slightly less than the distance between the external face 82 of the external ring 87 and the external face 83 of the internal ring 88 so that the stiff nut 32 tighten the assembly by seating the washer 31 against the metallic reinforcement 72 which sits on the border of the bore 94 belonging to the external face 83 of the internal ring 88. Moreover, each bore 92 and 94, made in the rings 87 and 88, carries a bush 33 fitted with a shoulder 34. The bush 33 which is mounted in the bore 92, has its shoulder 34, on the side of the internal face 85 of the external ring 87. The bush 33 which is mounted in the bore 94 has its shoulder 34, on the side of the internal face 86 of the internal ring 88. In this manner each shoulder 34 comes to sit on the external armature 17 of the corresponding laminated spherical stop 5 forming a bracing between the two rings.

In order to improve the characteristics of the hub body 81 according to the invention, especially the behavior characteristics in fatigue, each ring is surrounded by a belt in a manner similar to that which has been described in the preceding embodiment shown in FIGS. 4 and 5. The external ring 87 comprises a belt 95 mounted in a housing 97 made in this ring. In the same way, the internal ring 88 comprises a belt 96 mounted in a housing 98 made in this ring. Each of these housings 97 and 98 follows the contour of the corresponding ring and has a polygonal cross-section opening out radially to the exterior. This section is of rectangular form and its length is substantially parallel to the axis of the hub body 81. Without departing from the scope of the invention, this cross-section could equally well be square.

As in the embodiment relating to FIGS. 4 and 5 previously described, the belts 95 and 96 forming reinforcement and safety banding are of a composite material. The belts 95 and 96 are made of rovings or ribbons, which are composed of unidirectional fibers of high mechanical strength preimpregnated with polymerizable synthetic resins. They are placed in the housings 97 and 98 of the rings 87 and 88 by winding, the resin being subsequently hot-polymerized. Also, in one variant of the invention, the belts 95 and 96 forming safety and reinforcing banding are made of metallic, for example steel, wires embedded in an elastomer.

In the embodiment of the invention shown in FIGS. 6 and 7, the attachment of the blade 2 is in the form of a rigid shackle which surrounds the laminated spherical stop 5 in a continuous fashion, and is embedded in the stop. This attachment of the blade 2 is composed of the integral intermediate sleeve 99, which is shaped, on the rotor axis side, into a stirrup 100 of rectangular cross-section, and is shaped on the opposite side into a double clevis 101 linked to the corresponding blade 2. The stirrup 100 forms the attaching shackle of the blade 2 and is embedded in a corresponding housing 37 made in the internal armature 16 of the corresponding laminated spherical stop. The attachment of the blade 2 in the form of a stirrup 100 is maintained in place by a plate 19 which is fixed to the internal armature 16 by screws 20. The double clevis 101 acts with joining means of the foot of a corresponding blade 2. These joining means are shown in the figures by axes substantially parallel to the axis of the rotor, and they are embodied by holes 107 made in the branches of the double clevis 101.

The integral intermediate sleeve 99 also comprises a horn 102 fitted at its extremity with a clevis 103 linked to the rotor controls. The intermediate sleeve 99 moreover comprises, on the side opposite of the horn 102, a ball-and-socket attachment 104 for the extremity of an elastic drag return and damping strut 106 of the blade 2. Each elastic drag return and damping strut 106 of the blade 2 goes through the corresponding opening 90, in order to be attached to a solid member in the internal central area of the hub body 81. The two series of holes 107 receive pins which penetrate into the corresponding foot of the blade 2, to attach the blade 2 to this intermediate sleeve 99. This device has the advantage of permitting the blades 2 to be folded away at rest towards the axis of the rotor head, by freeing one of the two pins.

The rotor head which is equipped with the hub body 81 according to the invention also comprises flapping stops composed of a top stop of the direct support type, and by a bottom stop of the retractable type. The top flapping stop comprises a block 63 which is fitted onto a boss of the external branch of the double clevis 101. The top stop comes to rest directly, for a given positive angle of flapping, on the external ring 87. The bottom flapping stop is composed of a block 64 fitted on a lever mounted between two lugs 108 arranged on the internal branch of the double clevis 101. The bottom stop and its block 64 pivot under the action of centrifugal force and against a spring, which is not shown, around a shaft 65 which is mounted on the two lugs 108. The bottom flapping stop 64 comes to rest, for a given negative angle of flapping and a low or zero rotational speed of the rotor, on the metallic reinforcement 72 fixed on the circumference of the internal ring 88. The metallic reinforcement 72 is mounted on the internal ring 88 by the bolted linking pin 21, and is arranged between the external face 83 of the internal ring 88 and the washer 31 of the linking pin 21 The metallic reinforcement 72 is shaped and curved to follow the internal and lateral contour of the internal ring 88. The particularly compact device of the invention permits the entire rotor head to be faired.

A fairing 110 covers the entire device, surrounds and comes inside each of the feet of the blade 2. In this configuration the fairing 110 can be fixed onto an annular flange 109 made in on the exterior of the small base of the base plate 84.

The hub body 81 comprises an external ring 87 and an internal ring 88, which have a polygonal cylindrical form with rounded vertices 91 and 93, and each of these vertices corresponds to a given blade. Moreover, in this embodiment of the invention, the thin wall 89 has a form which is substantially polygonal cylindrical. In one variant of the invention not shown in the figures, the rings 87 and 88 and the thin wall 89 can have a circular form.

Figure 8:
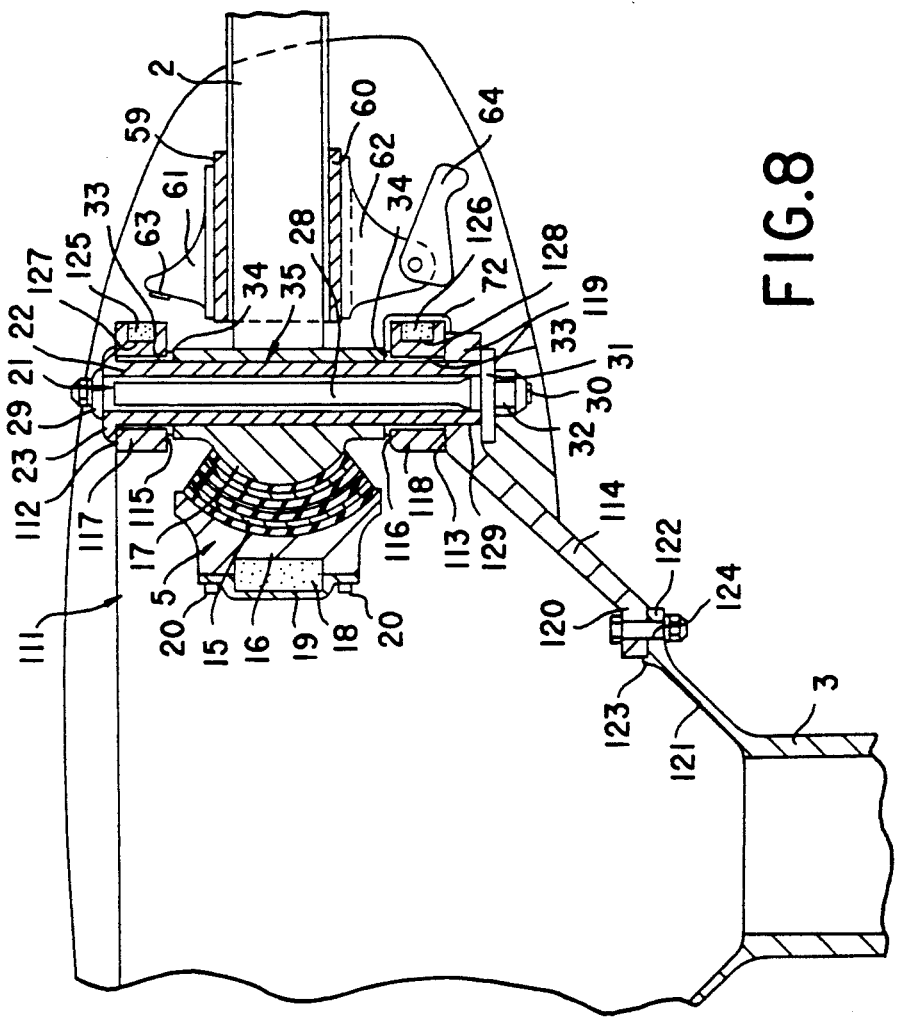
FIG. 8 is a view in axial cross-section of the assembly of a gyrocraft rotor head comprising a metallic hub body according to the invention, with the blade feet shackled, said hub body being connected to the mast by an independent metallic base plate.

In the embodiment shown in FIG. 8, the hub body 111 is metallic and linked to the mast 3 of the rotor by a metallic base plate 114, which is a separate piece. The hub body 111 comprises an external ring 117 and an internal ring 118 which are linked to each other by a thin wall not shown in the figure. In this thin wall are cut openings letting the laminated spherical stop 5 pass.

The laminated spherical stops 5 which constitute the sole articulation and retention member for each blade in flapping, drag and pitch are of a type similar to those previously described. Each laminated spherical stop 5 comprises a central part 15 associated with a rigid internal armature 16 and a rigid external armature 17. Each of these laminated spherical stops 5 is arranged between the external ring 117 and the internal ring 118, and are fixed to these rings by the their rigid external armature 17. As has been described in the preceding examples, the external ring 117 and the internal ring 118 have bores which are arranged in the area of the openings made in the thin wall, and which define an axis substantially parallel to the axis of the hub body, which is the axis of the fixing means of the rigid external armature 17 of the corresponding laminated spherical stop 5.

The base plate 114 has a truncated conical form with a thin wall whose large external base 119 is connected with the internal ring 118 by the agency of the fixing means of each of the laminated spherical stops 5. The base plate 114 also comprises at its other extremity a small internal base 120 which is connected to the divergent truncated conical extremity 121 of the mast 3. For that reason, the small base 120 of the base plate 114 is placed on a flange 122 belonging to the divergent truncated conical extremity 121 of the mast 3. The flange 122 also comprises an internal centering annular flange 123, which permits correct location of the small base 120 of the base plate 114. The base plate 114 is fixed the mast 3 by fixing bolts 124 which tighten the small base 120 against the flange 122 of the mast 3.

The fixing means of each of the laminated spherical stops 5 are composed of a bolted linking pin 21 similar to that previously described and which has a bolt 28 mounted in a hollow cylindrical shaft 22. The hollow cylindrical shaft 22 comprises, at one of its extremities, an annular flange 23 and is mounted in a corresponding bore in the external ring 117, in a bore 35 in the external armature 17 of the corresponding laminated spherical stop 5 and in a corresponding bore in the internal ring 118. The annular flange 23 sits on the external face 112 of the external ring 117. The bolt 28 is engaged in the hollow cylindrical shaft 22, has a head 29 which sits on the annular flange 23, and has another threaded extremity 30 onto which is engaged the large external base 119 of the base plate 114 through a bore 129 made in the base plate 114. A washer 31 and a stiff nut 32 are engaged finally on the threaded extremity 30 to tighten the assembly. The length under the annular flange 23 of the hollow cylindrical shaft 22 is slightly less than the distance between the external face 112 of the external ring 117 and the internal face of the large base 119 such that the stiff nut 32 tightens the whole by seating the washer 31 against the large base 119 of the base plate 114. Thus, the external face of the large base 119 sits against the external face 113 of the internal ring 118. Moreover, each bore made in the rings 117 and 118 carries a bush 33 fitted with a shoulder 34, which is mounted respectively on the internal face 115 of the external ring 117 and on the internal face 116 of the internal ring 118, in such a fashion as to sit on the armature 17 of the laminated spherical stop 5 forming a bracing between the two rings 117 and 118.

In the embodiment of the invention shown in FIG. 8, each laminated spherical stop 5 has its internal armature 16 embedded in the interior of a rigid buckle 18 constituting the attachment of the blade 2. Thus the blade, in the root area, is fitted out as a rigid shackle 18 of rectangular cross-section, which constitutes the attachment of the blade 2 and surrounds the laminated spherical stop 5 in a continuous fashion, and is embedded in a corresponding housing 37 made in the internal armature 16 of the stop. The attachment of the blade 2 in the form of a rigid shackle 18 is maintained in place by a plate 19 fixed onto the internal armature 16 by screws 20. The rigid shackle 18 is composed of rovings similar to those described previously.

In order to improve the characteristics of fatigue resistance of the hub body 111 according to the invention, each ring 117 and 118 is surrounded by a belt 125 and 126. The belt 125 is mounted in a housing 127 in the external ring 117, and the belt 126 is mounted in a housing 128 in the internal ring 118. Each housing 127 and 128 follows the contour of the corresponding ring and has a polygonal cross-section which opens out radially to the exterior. This cross-section is of rectangular form and has its length substantially parallel to the axis of the rigid hub body 111. In one variant of embodiment of the invention, this cross-section can be square.

Each of these belts 125 and 126 is of composite material with a structure similar to that which has been described for the embodiments shown in FIGS. 4 and 6. In the same way, each of these belts 125 and 126 may be made in metallic, for example steel, wires embedded in an elastomer.

The rotor head which is equipped with the rigid hub body 111 according to the invention also comprises flapping stops composed of a top stop of the direct support type and a bottom stop of the retractable type, are similar to the flapping stops described in the embodiment of the invention shown in FIG. 4. The top flapping stop comprises a block 63 fitted onto a boss 61 arranged on one of the plates 59 of the blades 2. This top stop comes to rest directly, for a given positive angle of flapping, on the external ring 117. The bottom flapping stop block 64 is fitted onto a lever mounted between two lugs 62, below the other internal plate 60 of the blade 2. This bottom stop and its block 64 pivot under the action of centrifugal force and against a spring, which is not shown, around a shaft 65 which is mounted on the two lugs 62. The bottom flapping stop 64 comes to rest, for a given negative angle of flapping and a low or zero rotation speed of the rotor, on a metallic reinforcement fixed to the circumference of the internal ring 118.

Figure 9:
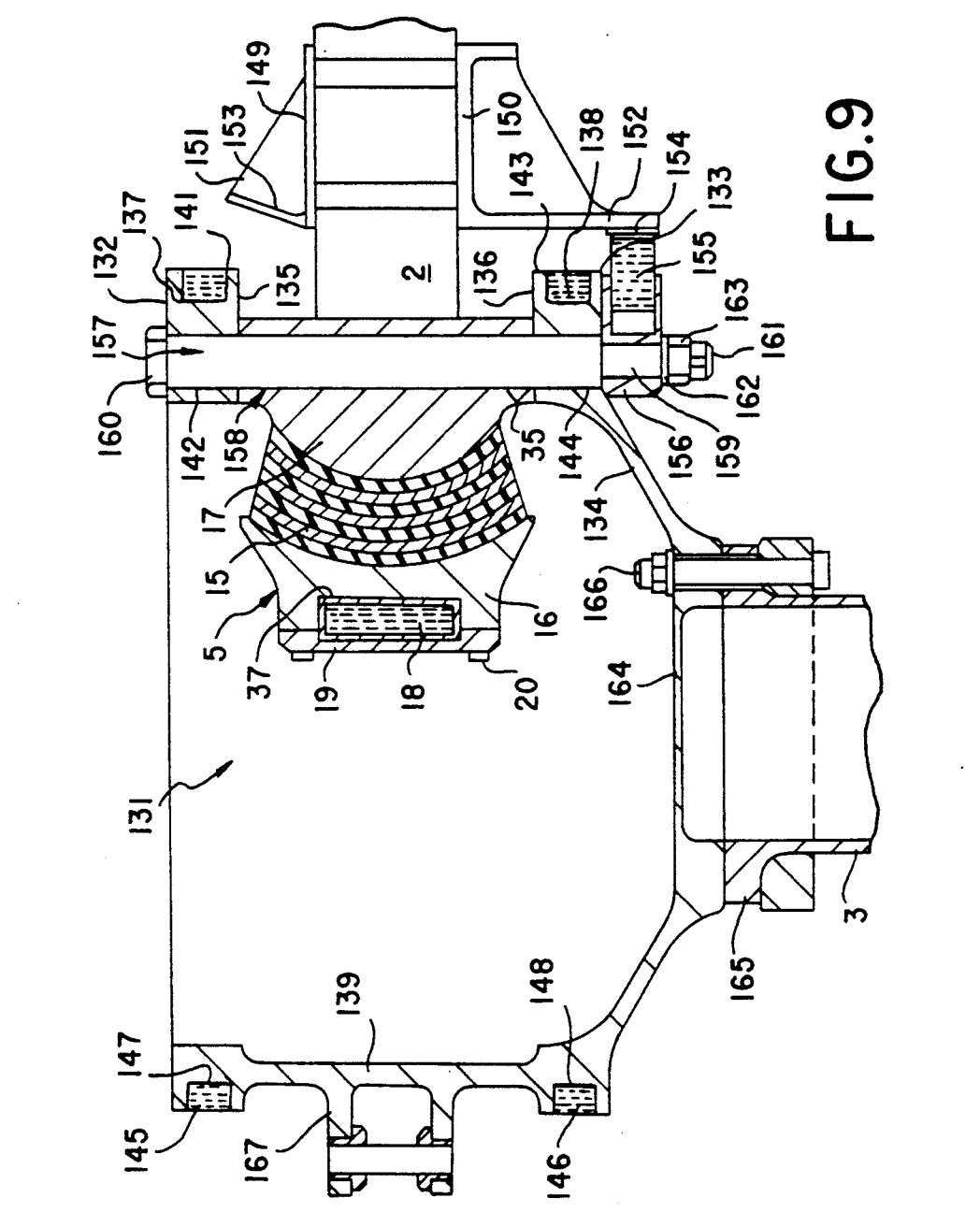
Figure 10:
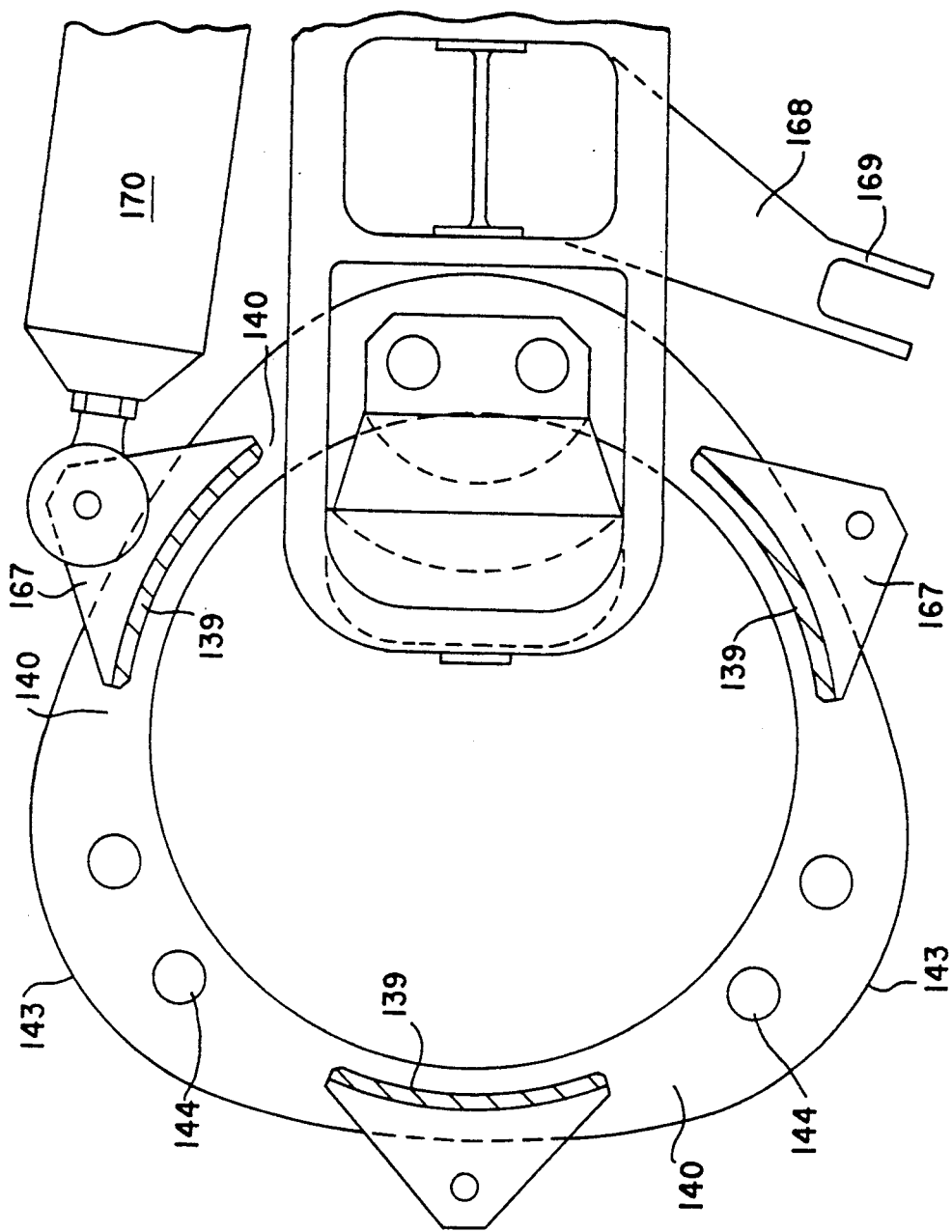
FIG. 10 is a view in partial cross-section of FIG. 9 through the plane passing through the axis of the blades.

FIGS. 9 and 10 show an embodiment of the invention in which the gyrocraft rotor hub body 131 is metallic and forms a single piece with a base plate 134 for linking with the rotor mast 3. This hub body can be made for example in aluminum alloy from a stamped blank which is subsequently turned and milled to obtain the external and internal form with the precision necessary for linking with the mast on the one hand and with the members for linking to the blades on the other hand. The hub body 131 is of the type in which each blade 2 of the rotor is linked by articulations in the form of laminated spherical stops 5 and linking members. In this architecture, the hub body 131 comprises an external ring 137 and an internal ring 138 linked to each other by a thin wall 139. Openings 140 are cut in this thin wall 139 letting each of the laminated spherical stops 5 pass with the attachment of the corresponding blade 2, such that, between two adjacent blades 2, there is only one element of the thin linking wall 139 remaining between the external ring 137 and the internal ring 138. The two rings 137 and 138 are separated from each other by a space sufficiently large to permit the housing of the laminated spherical stops 5. Each of these laminated spherical steps 5 is linked with the foot of the corresponding blade 2, with which it moves integrally around three perpendicular axes meeting at the center of the spherical stop 5, and is fixed to the two rings 137 and 138, at the periphery of these rings, in such a way as to constitute a rigid bracing between them. The thin wall 139 is of substantially circular cylindrical form and is arranged at the periphery of the rings 137 and 138. The openings 140 are of sufficient dimensions to permit the passage of the laminated spherical stop 5 with the attachment of the corresponding blade 2.

The hub body 131 is linked to the extremity of the rotor mast 3 by the truncated conical thin base plate 134 convergent towards the extremity of the mast 3, in such a manner as to link the internal ring 138 of the hub body 131 with the rotor mast 3. The thin base plate 134 has its large external base integral and integrated with the internal ring 138 and its small internal base 164 integrally fixed to the extremity of the mast 3 by bolts 166. The extremity of the mast 3 is composed of a flange 165 on which the bearing face of the small base 164 of the base plate 134 sits. The flange 165 and the small base 164 have series of holes arranged in a circle in such a manner as to be capable of receiving the bolts 166 which join the small base 164 to the flange 165 joining the hub body 131 with the mast 3 of the rotor.

The external ring 137 and the internal ring 138 are similar and have a polygonal cylindrical form with rounded vertices. The external ring 137 has rounded vertices 141 and the internal ring 138 has rounded vertices 143 which each correspond to a blade 2. Thus, the axis of a rounded vertex 141 corresponds to the axis of a rounded vertex 143, which both correspond to the axis of the opening 140 in the thin wall 139 and to the axis of the corresponding blade 2. In the case of FIGS. 9 and 10, the rotor for a helicopter comprises three blades arranged at 120° with respect to one another relative to the axis of the rotor and mounted in the hub body 131 with rings 137 and 138 having a triangular form with rounded vertices 141 and 143 which correspond to the openings 140 of the thin wall 139.

The laminated spherical stops 5 which constitute the sole articulation and retention member for each blade 2 in flapping, drag and pitch are of a type similar to those described in the preceding embodiments and comprise a central part 15 associated with a rigid internal armature 16, and a rigid external armature 17. Each of these laminated spherical stops is arranged between the external ring 137 and the internal ring 138 and are fixed to these rings by their rigid external armature 17. For that reason, the external ring 137 has bores 142 and the internal ring 138 has bores 144. These bores 142 and 144 are each arranged in the area of the openings 140 made in the thin wall 139. Each bore 142 is situated on the axis of the corresponding blade 2 and is made in a widened part of the external ring 137; and each bore 144 is situated on the axis of the corresponding blade 2 and is made in a widened part of the internal ring 138. Each bore 142 in the external ring 137 faces a corresponding bore 144 in the internal ring 138 in such a manner as to be capable of receiving the means of fixing of the rigid external armature 17 of the corresponding laminated spherical stop 5. The two bores 142 and 144 which are face-to-face are aligned with an axis which is substantially parallel to the axis of the hub body. Each of these axes is the axis of the fixing means of each of the corresponding laminated spherical stops 5 on the external 137 and internal 138 rings.

The means of fixing of each of the laminated spherical stops 5 are composed of two bolted linking spindles 157. Each bolted linking spindle 157 comprises a bolt 159 which is mounted in a hollow cylindrical shaft 158. The hollow cylindrical shaft 158 is itself mounted in the corresponding bore 142 of the external ring 137, in one of the two bores 35 of the external armature 17 of the corresponding laminated spherical stop 5 and in the corresponding bore 144 in the internal ring 138. The bolt 159 is engaged in the hollow cylindrical shaft 158, has a head 160 which sits on the external face 132 of the external ring 137, and has another threaded extremity 161 on which is engaged a stirrup 156, a washer 162 and a stiff nut 163. The length of the hollow cylindrical shaft 158 is slightly less than the distance between the external face 132 of the external ring 137 and the external face 133 of the internal ring 138 such that the stiff nut 163 comes to tighten the assembly by seating the washer 162 on the stirrup 156, sitting against the external face 133 of the internal ring 138. Each of the internal faces 135 of the external ring 137, and the internal faces 136 of the internal ring 138 sit on the external armature 17 of the corresponding laminated spherical stop 5 forming a bracing between the two rings 137 and 138.

In order to improve the characteristics of the hub body 131, especially the behavior characteristics in fatigue, the external ring 137 is surrounded by a belt 145 of the reinforcing banding type, and the internal ring 138 is surrounded by a belt 146 which is also of the reinforcing banding type. The belt 145 is mounted in a housing 147 in the external ring 137 and the belt 146 is mounted in a housing 148 made in the internal ring 138. Each of these housings 147 and 148 follows the contour of the corresponding ring and has a polygonal cross-section which opens out radially to the exterior. The cross-section is of rectangular form and its length is substantially parallel to the axis of the hub body 131. In one variant of the invention, shown in FIG. 9, this cross-section may be square.

In order to get the best out of this arrangement of this reinforcing banding, and to maximize the so-called "fail-safe" characteristics, these reinforcing bandings are of composite material, and have a structure and a composition which are similar to the belts described in the preceding embodiments. Each of these belts 145 and 146 forming reinforcing and safety banding is of unidirectional fibers with high mechanical strength preimpregnated with polymerizable synthetic resin. These belts 145 and 146 are made in rovings or in ribbons comprising such fibers, which are put in place on each ring 137 and 138 by winding, the resin being subsequently hot-polymerized. In one variant of the invention, each of these belts 145 and 146 forming safety and reinforcing banding is made in metallic, for example steel, wires embedded in an elastomer.

In the embodiment of the invention shown in FIGS. 9 and 10, each laminated spherical stop 5 has its internal armature 16 embedded in the interior of a rigid shackle 18 constituting the attachment of the blade 2. Thus the blade 2, in the root area, is fitted as a rigid shackle 18 of rectangular cross-section which constitutes the attachment of the blade and surrounds the laminated spherical stop 5 in a continuous fashion, and is embedded in a corresponding housing 37 made in the internal armature 16 of the stop. The attachment of the blade 2 in the form of a rigid shackle 18 is held in place by a plate 19 fixed onto the internal armature 16 by screws 20. The rigid shackle 18 is composed of rovings. Each roving is made by an assembly of basic thread, of filaments or of synthetic or mineral fibers with high mechanical strength, for example of glass, which are coated and agglomerated in parallel in a bundle by a hardened synthetic resin. This rigid shackle 18 extends into the current part of the blade 2 progressively forming the strong spar, on the leading edge, as well as the elements of the trailing edge. The linking members between the hub body 131 according to the invention and each of the blades 2 are constituted by elastic drag return and damping struts 170 of the blade 2 and a device for pitch control which is made as a pitch control lever linked to the rotor controls. In the embodiment shown, this pitch control lever is composed of a clevis 169, which is mounted at the extremity of a lateral horn 168 belonging to the two clamping plates 149 and 150 of the blade 2. The clamping plate 149 is mounted on the exterior of the corresponding blade 2, and the clamping plate 150 is arranged in the interior of this same blade 2, in such a manner as to be assembled together with respect to each other.

Each of the elastic drag return and damping struts 170 of the blade 2 links the foot of the corresponding blade 2 to the periphery of the hub body 131. For that reason, each of the extremities of the struts 170 comes to be fastened to the element of the corresponding thin wall 139 by the agency of a clevis 167 which is integrated with the element of the thin wall 139.

The rotor head which is equipped with the rigid hub body 131 according to the invention also comprises flapping stops composed of a top stop of the direct support type, and by a bottom stop of the retractable type. A top stop block 153 is fitted onto a boss 151 arranged on the clamping plate 149. The top stop comes to rest directly, for a given positive angle of flapping, on the external ring 137. A bottom flapping stop block 154 is also fitted onto a boss 152 fitted onto the clamping plate 150 of the blade 2. A reciprocal rigid ring 155 is maintained in place under the internal ring 138 of the hub body 131 by stirrups 156 held in place by the bolted linking spindles 157. These stirrups 156 are arranged in such a manner as to leave the reciprocal ring 155 limited flapping ability in its own plane. The bottom flapping stop also comes to rest, for a given negative angle of flapping, on the periphery of the reciprocal ring 155.

Figure 11:
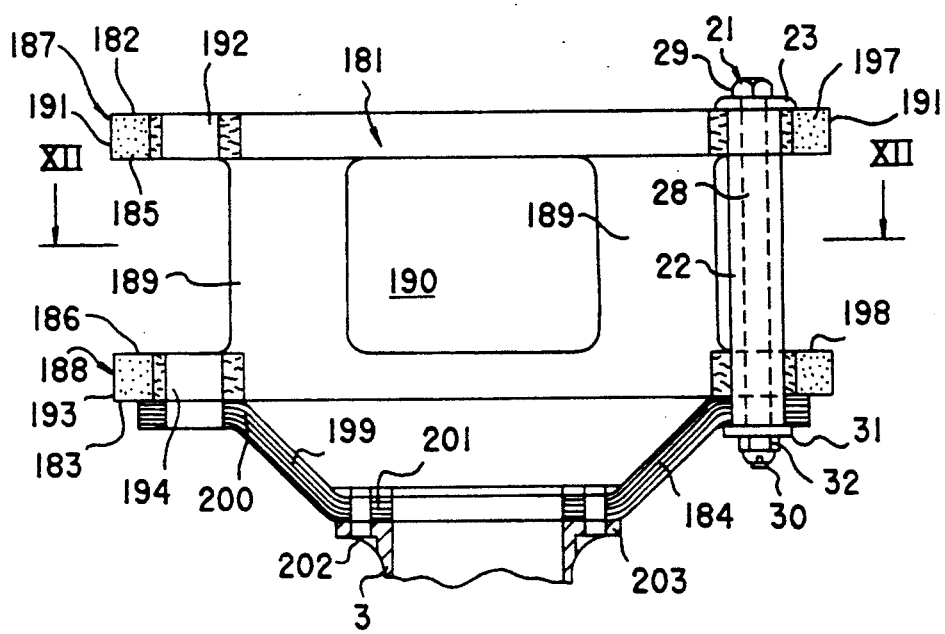
FIG. 11 is a view in axial cross-section of the assembly of a hub body in composite material according to the invention.
Figure 12:
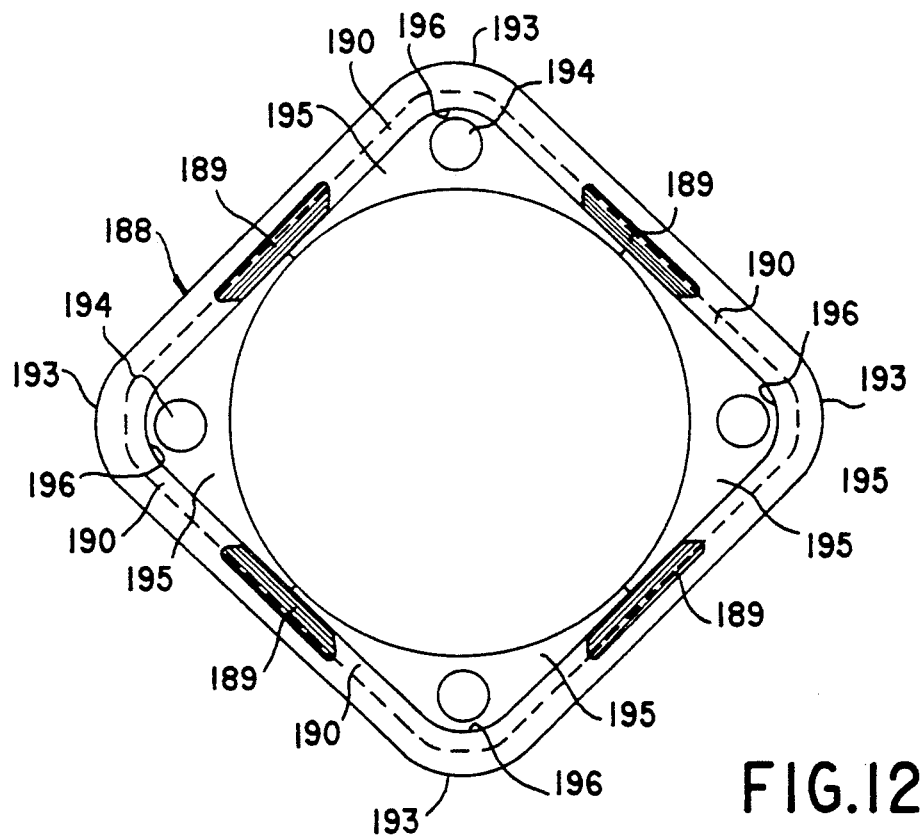
FIG. 12 is a view in partial cross-section along the plane XI—XI of FIG. 11.

FIGS. 11 and 12 show an embodiment of the invention in which the gyrocraft rotor hub body 181 of composite material and linked to the mast 3 of the rotor by a base plate 184 also of composite material. In this architecture, the hub body 181 comprises an external ring 187 and an internal ring 188 which are linked to each other by a thin wall 189. Openings 190 are cut in this thin wall 189 letting the articulations of the blades pass, composed of laminated spherical stops, which are not shown in the figures. The thin wall 189 is fitted out in such a way that, between two adjacent blades, there is only one element of the thin linking wall 189 remaining between the external ring 187 and the internal ring 188.

In the embodiment shown in FIGS. 11 and 12, the rigid hub body 181 is linked to the rotor mast 3 by a base plate 184 which is a separate piece. This base plate 184 has a part 199 of truncated conical form; one of its extremities is a large external base 200, and its other extremity is a small internal-base 201. The large base 200 sits against the external face 183 of the internal ring 188, and it is connected with the internal ring 188 by the fixing means of the laminated spherical stops with each of the external 187 and internal 188 rings. At the other extremity of the base plate 184, the small internal base 201 is connected to the divergent truncated conical extremity of the rotor mast 3. This linking is provided by a set of bolts 202 which connect a flange 203 arranged at the extremity of the rotor mast 3, and the small base 201 of the base plate 184.

The external ring 187 and the internal ring 188 are similar and have a polygonal cylindrical form with rounded vertices which each correspond to a blade. Thus, the axis of a rounded vertex corresponds to the axis of the opening 190 in the thin wall 189 and to the axis of the corresponding blade. In the case of FIGS. 11 and 12, the rotor for a helicopter comprises four blades which are diametrically opposed and mounted in a hub body 181 with rings having a square form with rounded vertices which correspond to the openings 190 of the thin wall 189. In one variant of the invention not shown in the figures, the rings and the thin wall may have a circular cylindrical form. Each of the laminated spherical stops, not shown in the figures, is arranged between the external ring 187 and the internal ring 188 and are fixed to these rings. For that reason, the external ring 187 has bores 192 and the internal ring 188 comprises has bores 194. These bores 192 and 194 are each arranged in the area of the openings 190 made in the thin wall 189. Each bore 192 is situated on the axis of the corresponding blade and is made in a widened part of the external ring 187; and each bore 194 is situated on the axis of the corresponding blade and is made in a widened part of the internal ring 188. Each bore 192 in the external ring 187 faces a corresponding bore 194 in the internal ring 188 in such a manner as to be capable of receiving the fixing means of the corresponding laminated spherical stop. The two bores 192 and 194 which are face-to-face are aligned with an axis which is substantially parallel to the axis of the hub body 181. Each of these axes is thus the axis of the fixing means of each of the corresponding laminated spherical stops onto the external 187 and internal 188 rings.

The fixing means of each of the laminated spherical stops are composed of a bolted linking pin 21 which comprises a bolt 28 mounted in a hollow cylindrical shaft 22. The hollow cylindrical shaft comprises, at one of its extremities, an annular flange 23 and is mounted in the corresponding bore 192 of the external ring 187, in a bore of the corresponding laminated spherical stop, not shown in FIG. 11, and in the corresponding bore 194 of the internal ring 188, the annular flange 23 coming to sit on the external face 182 of the external ring 187. The bolt 28 engages in the hollow cylindrical shaft 22, has a head 29 which sits on the annular flange 23, and has another threaded extremity 30 onto which is engaged the large base 200 of the base plate 184 holes, a washer 31 and a stiff nut 32. The length under the annular flange 23 of the hollow cylindrical shaft 22 is slightly less than the distance between the external face 182 of the external ring 187 and the internal face of the large base 200 of the base plate 184, in such a manner that the stiff nut 32 tightens the assembly by seating the washer 31 on the large base 200 of the base plate 184 which sits on the external face 183 of the internal ring 188. The internal face 185 and the external ring 187 and the internal face 186 of the internal ring 188 sit respectively on the Corresponding laminated spherical stop, thus forming a bracing between the two rings.

In the structure of the hub body 181 as a composite, each upper ring 187 and lower ring 188 is composed of as many identical flat pieces 195 as there are blades. Thus in the case of FIGS. 11 and 12, each ring 187 and 188 comprises four identical flat pieces 195. These flat pieces are juxtaposed against one another in such a manner as to form, in one continuous assembly, a framework. The flat pieces 195 have a rounded external corner 196, and they are fitted with the bore 192 or 194 which is situated in the axis of symmetry of the rounded external corner 196. These bores 192 and 194 receive the fixing means of the articulation of the corresponding blade, that is to say the corresponding laminated spherical stop, the bores 192 being arranged in the flat pieces 195 constituting the framework of the external ring 187 and the bores 194 being arranged in the flat pieces 195 constituting the framework of the internal ring 188. These flat pieces 195 thus form the basic framework of each of the external 187 and internal 188 rings, on which is arranged a shell which is composed of the reinforcing bandings of the rings 187 and 188, as well as by the thin wall 189 linking the two rings 187 and 188, in which are cut the openings 190 for the passage of the articulations and the linking members of each blade.

The flat pieces 195 of the framework of each of the rings 187 and 188 are made of filled resin of the type denoted by the English term "compound" and more precisely these pieces are in a molded compound of resin with cut carbon fibers. In this variant embodiment of the invention, the flat pieces 195 may be made by a stacking of carbon fabrics which are preimpregnated with synthetic resin, molded and hot-polymerized under pressure. The reinforcing banding 197 of the external ring 187, the reinforcing banding 198 of the internal ring 188 and the thin wall 189 constitute the shell which is of composite material. This composite material is composed of unidirectional fibers of high mechanical strength which are impregnated with hot-polymerizable synthetic resin. These fibers can be mineral or synthetic fibers. According to one embodiment of the invention, the shell of high-strength fibers is composed of wound rovings. According to another embodiment of the invention, the shell of high-strength fibers is composed of wound ribbons. According to another variant embodiment of the invention, the shell of high-strength fibers is composed of drape-formed fabrics. In these three embodiments, the fibers of the rovings, the fibers of the wound ribbons and the fibers of the drape-formed fabrics are either carbon fibers, or fibers of the aramid type.

The truncated conical base plate 184 for linking the internal ring 188 with the extremity 203 of the mast 3 is made by a stacking of fabrics of fibers with high strength, for example in carbon, preimpregnated with synthetic resin of the epoxy type, molded and hot-polymerized.

The rotor head equipped with the hub body 181 according to the invention makes it possible to obtain a structure which has the advantage of freeing the central part of the rotor. Therefore, the blade elastic drag return and damping struts can easily be integrated into it and the entire device with the blade foot linkings can be brought closer to the axis of the rotor. Moreover, this variant is lighter than that in which the hub body is metallic, by reason of the low specific weight of the structure.

What is claimed is:

1. A rotor hub body for a gyrocraft having plural blades (2) linked to said body by articulations and to one of said body (1) and another blade by and linking members (6), said hub body being attachable to a rotor mast and comprising two elements whose planes are substantially parallel to each other and perpendicular to the axis of the rotor mast, the two elements being separated from each other by a space sufficient to permit the housing of said articulations, wherein:

the two elements are rings, an external ring (7) and an internal ring (8) each forming a rigid rim and which are linked by a thin wall (9) of substantially cylindrical form, comprising at least as many openings (10) as there are blades (2), each opening (10) having dimensions sufficient for at least the passage and positioning of the articulations (5) of the corresponding blade (2) with their angular flappings;

each ring (7, 8) having at least one bore along an axis substantially parallel to the axis of the hub body, said bores being situated in each of the areas of said openings (10) made in the thin wall (9), each bore (12) of the external ring (7) facing a corresponding bore (14) in the internal ring (8) in such a manner as to be able to receive a means of fixing (21) of the articulation (5) of the corresponding blade;

and a thin base plate linking the hub body (1) and the rotor mast (3), said thin base plate (4) being of truncated conical form whose large external base is connected with the internal ring (8) and the small internal base is integral with an extremity of the rotor mast (3).

2. The hub body as claimed in claim 1, wherein the thin wall (89), which links the internal (88) and external (87) rings and which has at least as many openings (90) as there are blades (2), has each of its openings (90) with dimensions sufficient for the passage of at least one member (106) for elastic linking and drag damping of the corresponding blade (2) with their angular flappings as well as the passage and positioning for the articulations (5) of said blade.

3. The hub body as claimed in claim 1, wherein the thin wall which links the internal and external rings carries a clevis for the fixing of a means of elastic linking and drag damping of each of the blades.

4. The hub body as claimed in claim 1 wherein said body (1) is metallic and forms an integral piece with the base plate (4) and the mast (3).

5. The hub body as claimed in claim 1, wherein said body (131) is metallic and forms an integral piece with the base plate (134).

6. The hub body as claimed in claim 1, wherein said body (111) is metallic and is linked with the base plate (114) and the mast (3) by fixing means capable of being dismantled.

7. The hub body as claimed in claim 6, wherein the fixing means of the hub body (111) onto the base plate (114) are the fixing means of the articulation (5) of the blade (2) on the internal ring (118) of the hub body (111).

8. The hub body as claimed in clain 1, wherein the rings have a circular cylindrical form.

9. The hub body as claimed in claim 1, wherein the rings (7) (8) have a polygonal form with rounded vertices (11) (13), of which each vertex corresponds to the axis of a blade (2).

10. The hub body as claimed in claim 1, wherein at least one ring (47, 48) is surrounded by a belt (55, 56) forming safety and reinforcing banding.

11. The hub body as claimed in claim 10, wherein the belt (55, 56) forming safety and reinforcing banding is made of rovings of fibers with high mechanical strength agglomerated by polymerizable synthetic resin.

12. The hub body as claimed in claim 10, wherein the belt (55, 56) forming safety and reinforcing banding is made of ribbons of fibers of high mechanical strength agglomerated by polymerizable synthetic resin.

13. The hub body as claimed in claim 10, wherein said belt forming safety and reinforcing banding is fitted within a housing (57, 58) which follows the contour of said ring (47, 48), said housing having a polygonal cross-section which opens out radially towards the exterior of the ring and receives said belt (55, 56) forming safety and reinforcing banding.

14. The hub body as claimed in claim 13, wherein the housing (57, 58) is of square cross-section.

15. The hub body as claimed in claim 13, wherein the housing (57, 58) is of rectangular cross-section.

16. The hub body as claimed in claim 10, wherein the belt (55, 56) forming safety and reinforcing banding comprises unidirectional fibers with high mechanical strength preimpregnated with polymerizable synthetic resin and is made by one of rovings and ribbons comprising such fibers which are put in place on said at least one ring by winding, the resin being subsequently hot-polymerized.

17. The hub body as claimed in one of claims 11, 12, or 16, wherein the fibers are aramid fibers and wherein the synthetic resin is of the epoxy type.

18. The hub body as claimed in claim 10, wherein the belt (55, 56) forming safety and reinforcing banding is made from metallic wires embedded in an elastomer.

19. The hub body as claimed in claim 1, wherein said hub body (181) is of composite material.

20. The hub body as claimed in claim 19, wherein each ring (187, 188) is composed of as many identical flat pieces (195) as there are blades (2), these flat pieces (195) being juxtaposed in such a manner as to form, in one continuous assembly, a framework, said flat pieces (195) having a rounded external corner (196), and being fitted in the axis of symmetry of the corner (196) with the bore (192, 194) receiving the fixing means of the articulation (5) of the blade (2), and wherein on this framework is arranged a shell composed of fibers of high mechanical strength impregnated with hot-polymerizable synthetic resin in order to constitute reinforcing bandings (197, 198) of the rings (187, 188) as well as the thin linking wall (189) of the two rings (187, 188) in which are cut out the openings (190) for the passage and positioning of the articulations and wherein said dimensions of said openings are additionally sufficient for passage and positioning of the linking members of each blade.

21. The hub body as claimed in claim 20, wherein the flat pieces (195) constituting the framework of the rings (187, 188) are made of molded resin compound with cut carbon fibers.

22. The hub body as claimed in claim 20, wherein the flat pieces (195) constituting the framework of the rings (187, 188) are made by a stacking of carbon fabrics preimpregnated with synthetic resin, hot-polymerized under pressure.

23. The hub body as claimed in claim 20 wherein the shell of fibers with high strength arranged around the framework of the rings (187, 188) in order to constitute the reinforcing bandings (197, 198) of the rings (187, 188) and the thin wall (189) for linking the two rings (187, 188) is composed of wound rovings.

24. The hub body as claimed in claim 23, wherein the fibers of the rovings.

25. The hub body as claimed in claim 23, wherein the fibers of the rovings are of the aramid type.

26. The hub body as claimed in claim 20, wherein the shell of fibers of high strength arranged around the framework of the rings (187, 188) in order to constitute the reinforcing bandings (197, 198) of the rings (187, 188) and the thin wall (189) for linking the two rings (187, 188) is composed of wound ribbons.

27. The hub body as claimed in any one of claims 20 to 22, wherein the shell of fibers of high strength arranged around the framework of the rings (187, 188) in order to constitute the reinforcing bandings (197, 198) of the rings (187, 188) and the thin wall (189) for linking the two rings (187, 188) is composed of drape-formed fabrics.

28. The hub body as claimed in claim 19, wherein the truncated conical base plate (184) for linking the internal ring (188) with the extremity of the mast (3) is made by a stacking of fabrics preimpregnated with synthetic resin, molded and hot-polymerized.

29. The hub body as claimed in claim 28, wherein the fabrics constituting the base plate (184) for linking the internal ring (188) to the mast (3) are carbon fabrics preimpregnated with epoxy resin.

30. A gyrocraft rotor head which comprises a hub body as claimed in claim 1 and a blade attachment for each blade.

31. The rotor head as claimed in claim 30, wherein the articulation and linking member for each blade (2) on the hub body is a laminated spherical stop (5), said laminated stop having an internal armature (16) embedded in the interior of a rigid shackle constituting the attachment of the blade (2), said shackle surrounding the laminated spherical stop (5) in a continuous fashion, and an external armature integral with the internal (8) and external (7) rings of the hub body by at least one bolted linking pin (21) through said external armature (17) and each of the corresponding bores (12, 14) made in the rings (7, 8).

32. The rotor head as claimed in claim 31, wherein the external armature (17) of the laminated spherical stop is immobilized in drag by two fixing screws (71) going through one of the rings (47, 48) of the hub body (41) and arranged on either side of the bolted linking pin (21) securing said external armature (17) to the two rings (47, 48) of the hub body (41).

33. The rotor head as claimed in claim 31, wherein the bolted linking pin (21) going through the external armature (17) of the laminated spherical stop (5) and the corresponding bores made in the rings (7, 8) of the hub body (1) comprises a hollow cylindrical shaft (22) comprising at one of its extremities an annular flange (23) which comes to sit on an external face (24) of the external ring (7), said hollow shaft (22) having a length slightly less than the distance between the two external faces (24, 25) of the rings (7, 8) and a bolt (28) having a head (29) bearing on said annular flange (23) of the hollow shaft (22) and a threaded extremity (30) opposite said head receiving a stiff nut (32) and a washer (31) which bear on the border of the bore (14) made in the internal ring (8).

34. The rotor head as claimed in claim 31, wherein each bore (12, 14) made in the rings (7, 8) of the hub body (1) carries a bushing (33) fitted with a shoulder (34) mounted on an internal side (26, 27) of the ring (7, 8) in such a way as to sit on the external armature (17) of the laminated stop (5), said bushings (33) and said external armature (17) forming a bracing between the two rings (7, 8).

35. The rotor head as claimed in claim 31, wherein the attachment of the blade (2) in the form of said rigid shackle is composed of rovings which form a strong spar of the blade (2) and has a rectangular cross-section in a root area of the blade.

36. The rotor head as claimed in claim 35, wherein the blade attachment (2) in the form of a rigid shackle which surrounds the laminated spherical stop in a continuous fashion embedding in said stop (5), is held confined in a corresponding housing (37) made in the internal armature (16) of the stop (5) by a plate (19) fixed on the internal (16) by screws (20).

37. The rotor head as claimed in claim 31, wherein the blade (2) attachment in the form of said rigid shackle is an intermediate integral sleeve (99) shaped as a stirrup (100) of rectangular cross-section in order to form a blade-attachment shackle and shaped on the opposite side as a double clevis (101) in order to cooperate with means for joining the foot of said blade (2), which sleeve (99) also comprises laterally a horn (102) fitted at its extremity with a clevis (103) linkable to rotor controls of said gyrocraft and a ball-and-socket attachment (104) opposite said horn for the extremity of a blade elastic drag return and damping strut (106).

38. The rotor head as claimed in claim 30, which comprises flapping stops.

39. The rotor head as claimed in claim 38, wherein each blade attachment comprises a top flapping step and a bottom flapping stop, each stop having a block the block (63) of the top stop coming to rest directly, for a given positive angle of flapping, on the circumference of the external ring (47) and the block (64) of the bottom stop coming to rest, for a given negative angle of flapping, on a metallic reinforcement (72) fixed on the circumference of the internal ring (48).

40. The rotor head as claimed in claim 38, wherein the articulation and linking member for each blade (2) on the hub body is a laminated spherical stop (5) having an external armature integral with the internal (138) and external (137) rings of the hub body by at least one bolt through said external armature (17) and each of the corresponding bores made in the rings (137, 138) and wherein each blade attachment comprises a top flapping stop and a bottom flapping stop, each stop having a block, the block (153) of the top stop coming to rest directly, for a given positive angle of flapping, on the circumference of the external ring (137) and the block (154) of the bottom stop coming to rest directly, for a given negative flapping angle, on the periphery of a rigid reciprocal ring (155), said reciprocal ring being maintained in place under the internal ring (138) of the hub body (131), and parallel to the internal ring (138), by stirrups (156) fixed to the hub body (131) by the at least one bolt (159) for fixing the external armature (17) of the laminated stop (5) onto the rings (137, 138) of the hub body (131), these stirrups (156) being arranged in such a manner as to leave the reciprocal ring (155) a limited flapping ability in its own plane.

41. The rotor head as claimed in claim 30, wherein each blade attachment comprises drag stops (66, 69) arranged on lateral horns situated on either side of the axis of the blade (2) and which come, for a given drag angle, to rest directly against the circumference of at least one of the rings (47, 48).

* * * * *

UNITED STATES PATENT AND TRADEMARK OFFICE
CERTIFICATE OF CORRECTION

PATENT NO. : 5,267,833
DATED : December 7, 1993
INVENTOR(S) : Rene L. Mouille

It is certified that error appears in the above-indentified patent and that said Letters Patent is hereby corrected as shown below:

Column 25, Claim 1, line 3, after "by" delete "and".

Signed and Sealed this

Thirtieth Day of August, 1994

Attest:

BRUCE LEHMAN

Attesting Officer

Commissioner of Patents and Trademarks